Sept. 20, 1966  C. H. CLARK ETAL  3,274,338
TELEGRAPHIC RECORDER HAVING PLANETARY OPERATOR
Original Filed Dec. 6, 1961  7 Sheets-Sheet 2

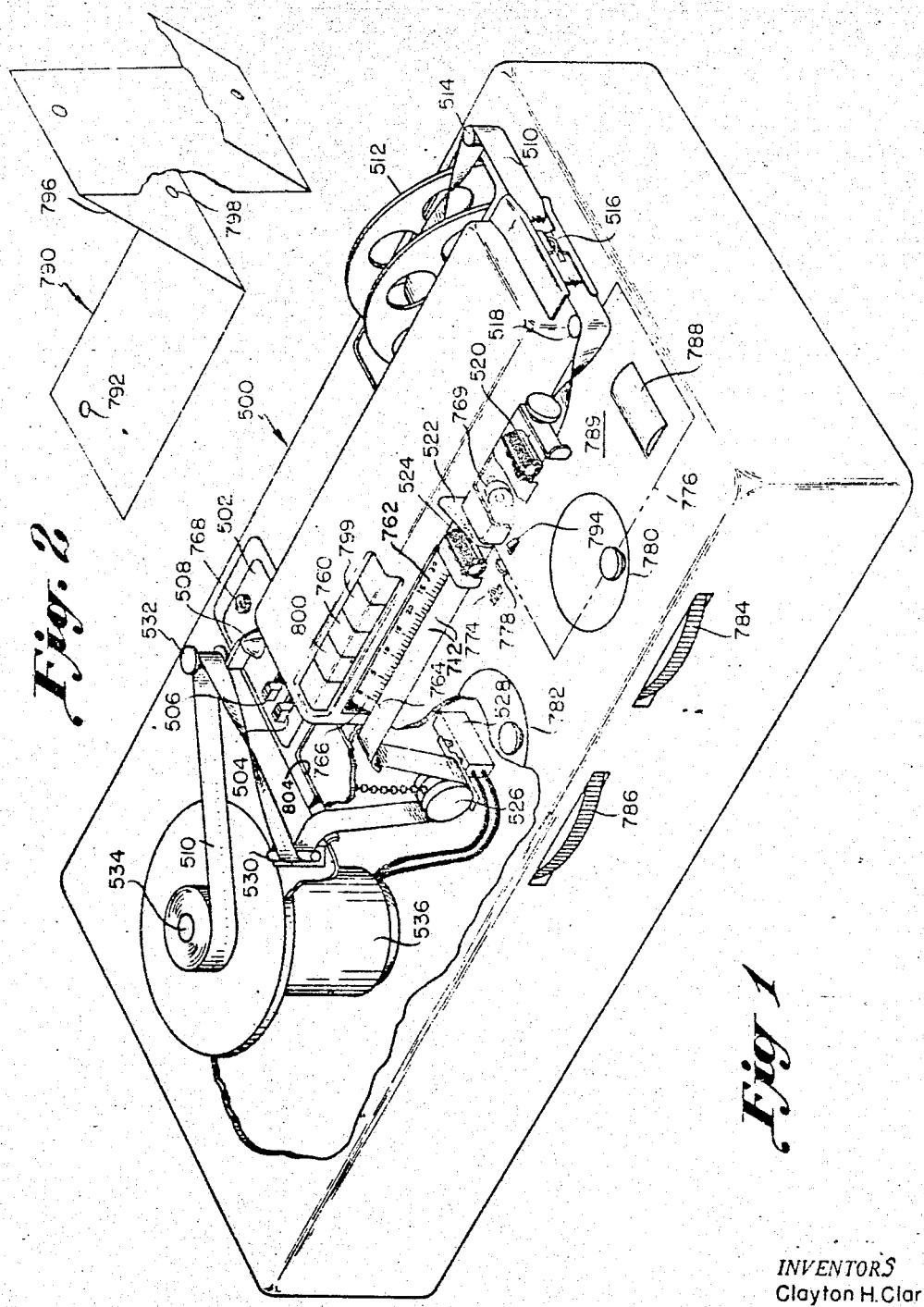

INVENTORS
Clayton H. Clark
Carl P. Anderson
BY
Attorneys

INVENTOR.
Clayton H. Clark
Carl P. Anderson
BY
Attorneys

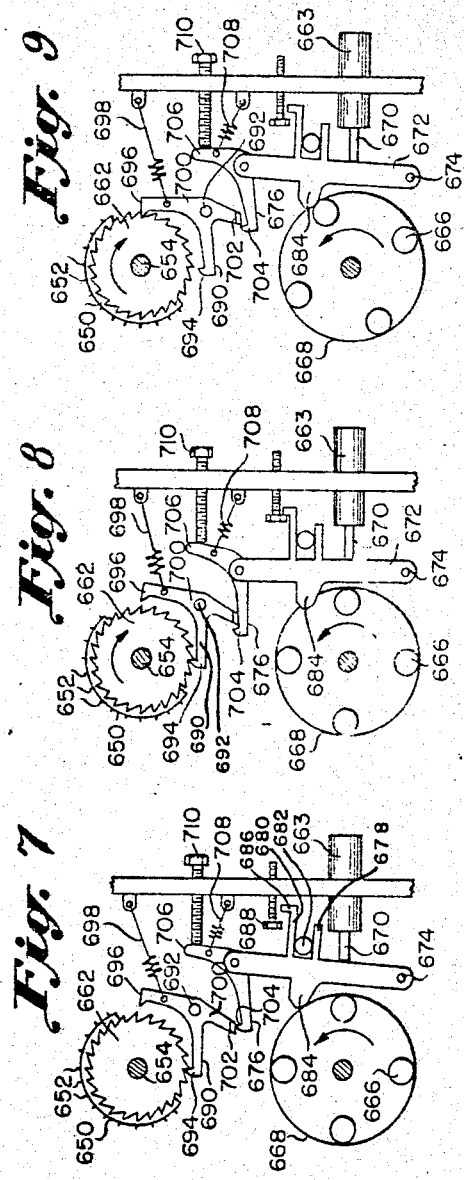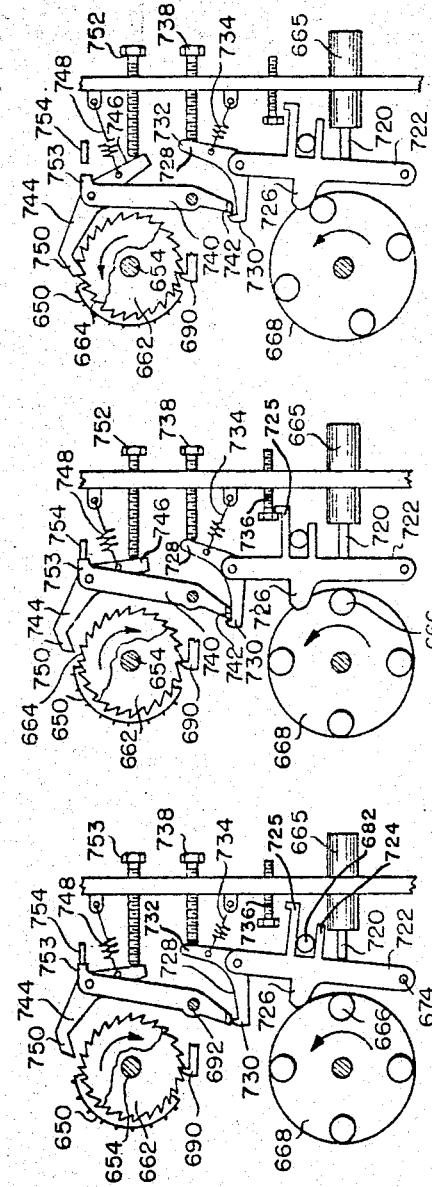

Sept. 20, 1966    C. H. CLARK ETAL    3,274,338
TELEGRAPHIC RECORDER HAVING PLANETARY OPERATOR
Original Filed Dec. 6, 1961    7 Sheets-Sheet 5

INVENTORS
Clayton H. Clark
Carl P. Anderson
BY
Attorneys

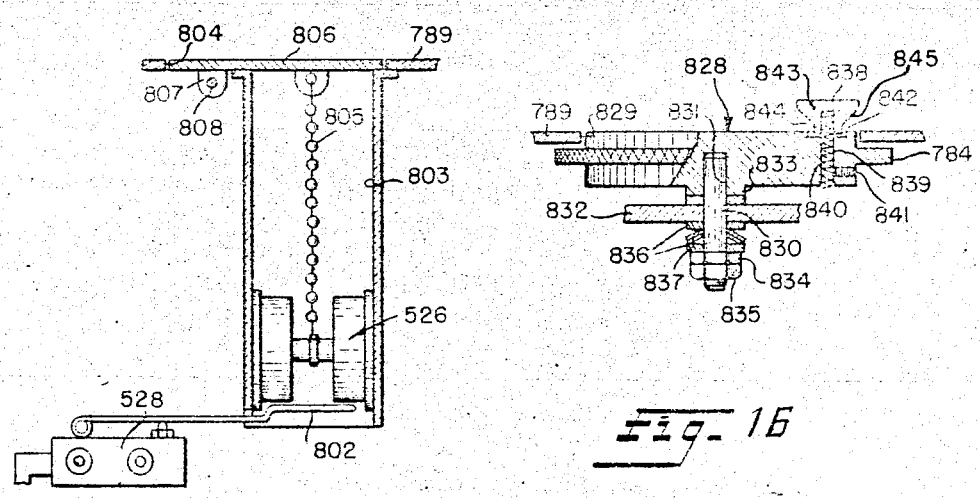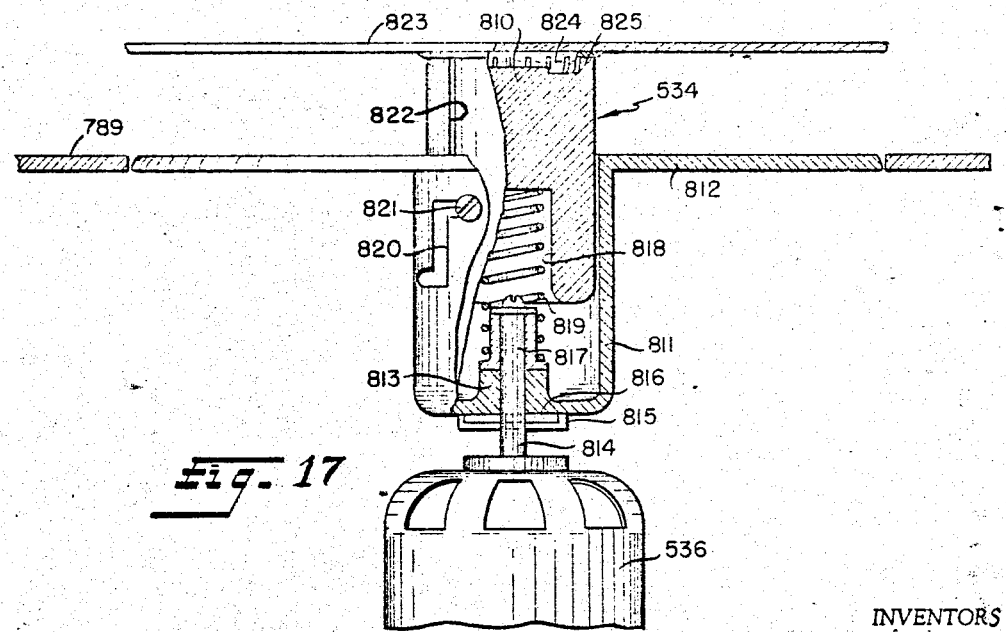

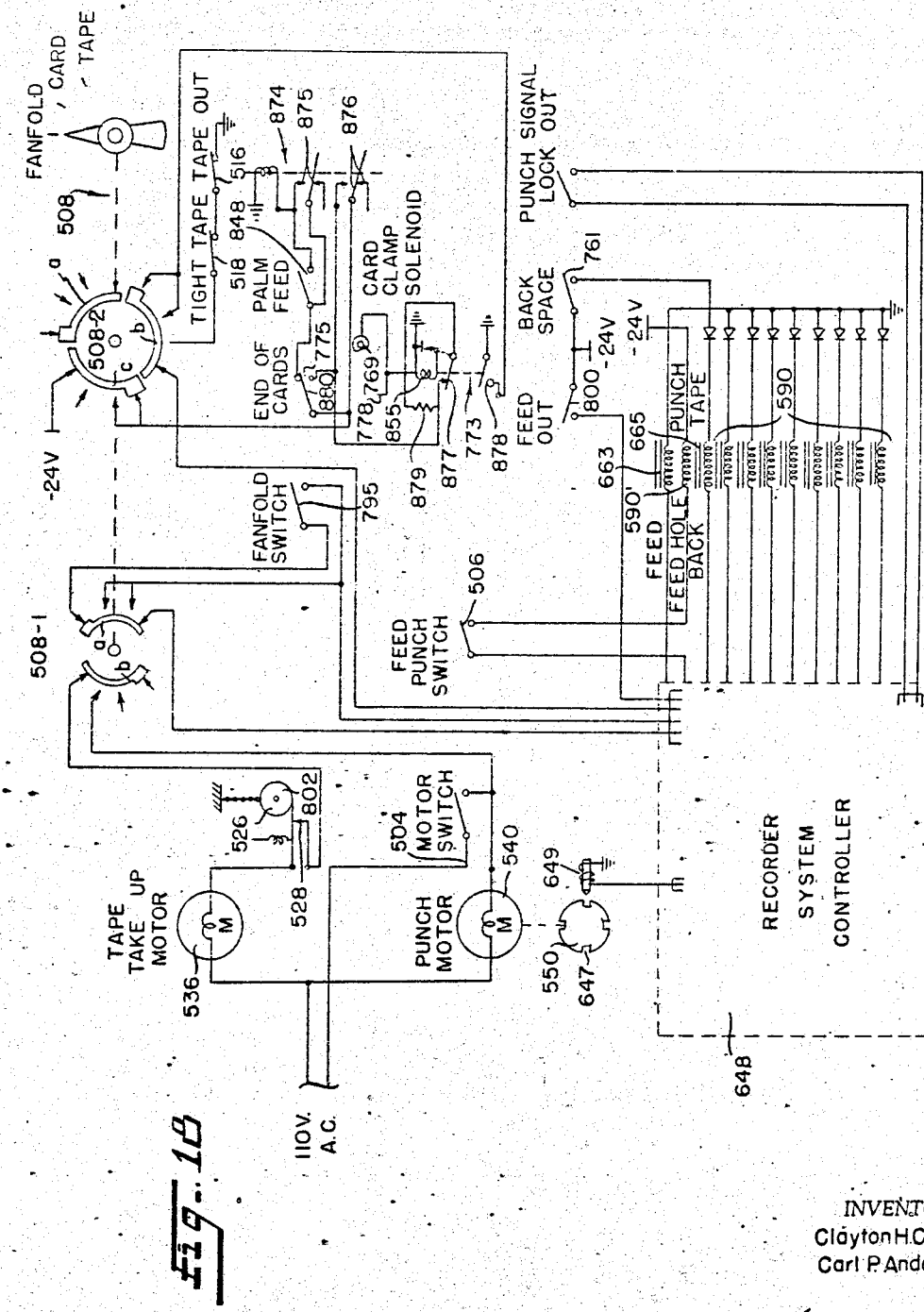

3,274,338
Patented Sept. 20, 1966

3,274,338
TELEGRAPHIC RECORDER HAVING PLANETARY OPERATOR
Clayton H. Clark, Mundelein, Ill., and Carl P. Anderson, Homer, N.Y., assignors to SCM Corporation, New York, N.Y., a corporation of New York
Original application Dec. 6, 1961, Ser. No. 157,540. Divided and this application May 14, 1964, Ser. No. 367,410
39 Claims. (Cl. 178—17)

This invention pertains to recording apparatus with planetary operating mechanism enabling extremely high speeds of positive machine operation, the apparatus being embodied in a modification enabling punching of messages in coded condition on tape or other medium. The message may originate from data communicating systems such as telegraphic transmitters, calculators, business machines or other similar telegraphic media. This application is a division of co-pending application Serial No. 157,540 filed December 6, 1961, now Patent No. 3,205,305, dated September 7, 1965.

The basic mechanism of the apparatus hereinafter described in accord with the present invention constitutes an epicyclic power transfer mechanism in which the cycloidal paths developed during planetating rotation of a plural number of members are used to obtain sharply defined, positive force transfer movements which result in recording operations. Each planetary member carries at least one operating unit, e.g., a punch group operating cam. Such units are conjointly rotated and planetated past one or more operating stations, i.e., actuation position points where punching operations may take place. The basic planetating mechanism is used in conjunction with a separate code punch selecting assembly which furnishes the power necessary for actual mechanical selection of desired punches which is followed by a subsequent power application from the planetating mechanism to accomplish operation of selected punches and also sequential performance of machine functions such as step feeding of the record, normally necessary in recording devices.

The basic recorder mechanism can be used for perforation recordations on various record media and to this end the embodiment as hereinafter disclosed illustrates a complete reperforator unit capable of recording data in the manner of code perforations in different forms of record media such as tape, record cards and fanfold records. Of importance in the reperforator unit is its inherent ability, due to the rugged nature of the planetary mechanism, to accomplish punching of record feed holes in record cards and fanfold records which do not have pre-punched feed holes as well as in record tape. Furthermore, because it has become standard practice in the data processing field to use record cards and fanfold records with pre-punched feed holes for reasons discussed hereinafter, the complete perforator described hereinafter includes convenient controls to render its feed punch section automatically operative or inoperative as desired.

Very briefly, the recorder concept includes a planetary mechanism which provides the forces necessary for actual recording operations and the force is developed at outer peripheral peaks of cycloidal paths of movement of parts of planetating members. The paths are hypocycloidal if the planetating members are rotated within a ring gear and are epicycloidal if rotated about a sun gear. However, for convenience of standard terminology hereinafter, the paths will be referred to as hypocycloidal and the peaks will be referred to as hypocycloidal peaks. Selection is accomplished in two ways, both of which require relative repositioning between recording components and the planetating operating components. In one case, selection is accomplished by a shift of the angular cyclic phase positions of the repetitive cycloidal paths of data representative units on the planetating member so different hypocycloidal peaks occur at a specific operating position at the periphery of the planetary mechanism. This manner of selection rephasing the cycloidal paths can be accomplished by a selectively rotated, secondary input to the planetary mechanism. The second manner of selection is accomplished exterior of the planetary mechanism and includes plural operating mechanisms which can be selectively shifted into fixed hypocycloidal peak positions of the planetating members. Mechanism for accomplishing selection in the latter manner will be fully described hereinafter.

Accordingly, a primary object of this invention resides in the provision of a novel recorder having a planetary operating mechanism, the recorder being capable of receiving code data and recording punched code manifestations of that data with reliability and dependability while operating at high speeds.

Another object resides in the provision of a novel high speed recorder having selective recording components and a planetary operating mechanism which provides a momentary high speed positive force to operate the recording components, the selection of desired recordation being accomplished by mechanism which results in a relative shift between recording components and cycloidal paths of movement of planetating operating components.

A further object resides in the novel arrangement relative to a planetary operator assembly in a reperforator of the recording and function operating mechanisms operated by intermediate impact transfer levers in such a manner as to permit use of similarly shaped interchangeable transfer levers and to also permit interchangeability of identical code punches excepting for the feed hole punch which is of smaller diameter.

A further object resides in the provision of a novel planetary type of selective punch perforator in which the force for operating all punches is derived from a hypocycloidal peak movement of a planetating cam member.

In conjunction with the preceding object, a further object resides in utilizing a plural number of novel planetating cam members and making each planetating cam member with dual cam edges to accomplish a plurality of hypocycloidal peak movements at spaced angular locations around the axis of the planetary assembly, the peaks occurring at different time periods during one revolution of the planetary assembly and thereby permitting rapid sequential punch operating and punch retracting movements to be accomplished with an operating stroke of substantial length due to a hypocycloidal peaking movement at a precise position on a substantially radial line within an extremely short increment of time.

Still another object resides in providing a planetary perforator with novel selection mechanism for all punches including the feed punch comprising solenoid shifted, individual punch levers shiftable into operative position relative to a planetating cam assembly, each punch lever being associated with a retracting lever which is shifted into an operative position relative to a planetating cam assembly conjointly with a shift of a selected punch lever, and the planetating cam assembly, in rapid succession, acting upon any selected punch lever during a hypocycloidal peaking movement of a cam to force the punch lever and a connected punch to a punching position and then acting upon any selected punch retracting lever during a succeeding hypocycloidal peaking movement of a cam to retract the operated punch and shift the selected punch levers and associated retracting levers to normal non-selected position.

A still further object resides in the provision in a high speed recorder of a novel escapement type of record medium feed mechanism.

In conjunction with the preceding object, a further object resides in the provision of a rotatable pin feed wheel engaging punched feed holes in a record medium, the feed wheel and an attached ratchet toother wheel being rotatably coupled to a power drive through a slip coupling and held against rotation by a double pawl escapement lever cooperatively engaging said ratchet wheel, the mechanism which operates the escapement lever constituting a novel positively driven escapement movement, triggered and positively operated by a power driven cam wheel subsequent to a cocking actuation by energization of a feed solenoid.

In further conjunction with the two preceding objects, a still further object resides in providing a novel backspacing mechanism which is similar to the feed mechanism, however, it differs in that the positive backspacing movement is accomplished by a driven pawl acting on a second ratchet wheel secured to the record feed wheel to step drive the feed wheel backward against the slip coupling bias force and the escapement lever is utilized as a feed wheel detent device.

Another object resides in the provision of a novel planetary reperforator with a feed punch system having controls enabling the feed punch mechanism to invariably punch a feed hole during every signal responsive reperforator recording operation or completely deleting all operation of the feed hole punch.

Still another object resides in the provision of a novel planetary reperforator in accord with the foregoing object in which provisions are made to accommodate different record medium such as tape, cards or fanfold records, and mechanism is provided, rendered operative during fanfold operation to cooperate with prepared fanfold records and automatically feed a new record into a start position upon completion of desired code punching of the preceding fanfold record.

In conjunction with the foregoing object a further object resides in provision of novel control mechanism rendered operative by placing the reperforator in a record card type of operation whereby a leading edge card stop is automatically projected into the path of a record card to enable such a card to be inserted to a starting position and perforating operations are initiated by pressing down upon the card whereupon the leading edge card stop is automatically retracted.

A further object resides in the provision in a perforator of a novel indexing feed apparatus which includes a preliminary record medium feed device and a correlated primary record medium feed device. In conjunction with this object further objects reside in the provision of a novel step driven output sprocket feed device coupled with a 1:1 drive ratio to a smooth, clamped roll input feed device rendered automatically inoperative to feed a record or to prevent backspacing of a record medium when the sprocket feed has engaged the record medium; and a card initial position locator correlated in operation with the preliminary record feed device.

Additional objects reside in the provision in a perforator machine of novel subassemblies such as:

(1) A tape record output slack loop maintaining assem and its control to avoid undesired tension in tape take-up winding and to provide excess tape for backspacing.

(2) A tape record take-up table with depressable center post and easily removable cover attached to the center post to provide ease in handling the tape record output and to enable the making of the output perforator table flush for outfeed of fanfold and card records.

(3) Unitary adjustable record card guides which are friction held in adjusted position and enable at light bias pressure against and confining the path of a card edge by a unique edge guide button assembly.

(4) A chad exit cover and deflecting duct provided on its inner surface with a dry lubricant to obtain nonclogging smooth outflow of chad from the dies at ultrahigh speeds of operation.

Further novel features and other objects of this invention will become apparent from the following detailed description, discussion and the appended claims taken in conjunction with the accompanying drawings showing a preferred structure and embodiment, in which:

FIGURE 1 is a perspective view of a reperforator version of the present invention, designed to punch a tape, card or other record media, the figure being partially broken away to better illustrate details, particularly those of a tape take-up mechanism;

FIGURE 2 is a view showing fanfold paper (or cards) which may be used in the reperforator machine shown in FIGURE 1;

Figure 13:
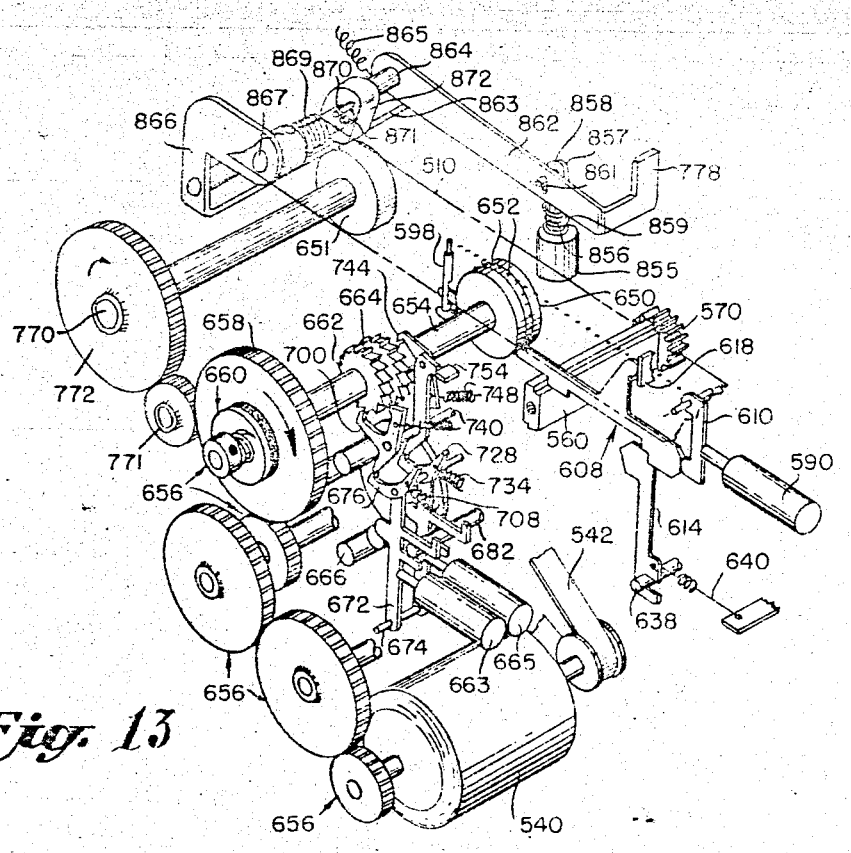
Figure 14:
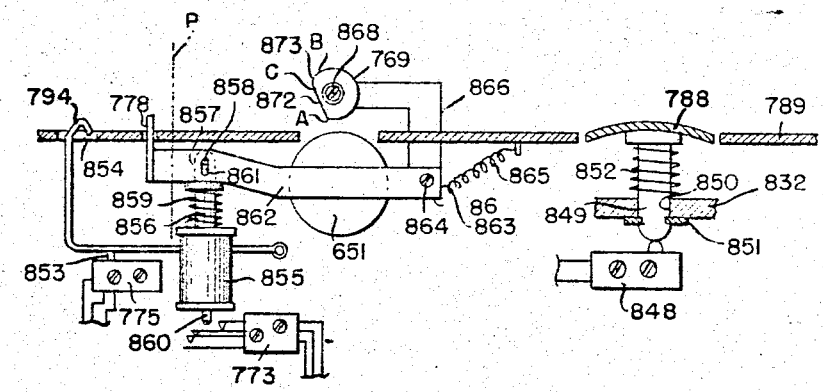

FIGURES 7, 8 and 9 illustrate the tape feed components for the punching mechanism of FIGURE 1: FIGURE 7 illustrating the rest or normal position with activating solenoid de-energized; FIGURE 8 showing the tape feed mechanism after the activating solenoid is energized and with the cocking lever in a cocked position; and FIGURE 9 showing the tape feed mechanism triggered and tape feeding operation completed;

FIGURES 10, 11 and 12 illustrate the tape back-space mechanism for FIGURE 1: FIGURE 10 illustrating the rest position with activating solenoid de-energized; FIGURE 11 showing the tape back-space mechanism with activating solenoid energized and the cocking lever in a cocked position; and FIGURE 12 showing the tape back-space mechanism triggered and tape back-spacing completed;

FIGURE 13 is a skeletonized perspective view showing the various punching and feed components illustrated in FIGURES 2–12 and their relationship to one another;

FIGURE 14 is a cross-section view of various card control components, e.g. end of card feeler, card stop, card clamping-pre-feed solenoid and palm plate;

FIGURE 15 is a detail section view of the weighted roller slack loop tape control device;

FIGURE 16 is a section detail of one of the adjustable card guides;

FIGURE 17 is a section detail of the tape take-up reel and components; and

FIGURE 18 is a circuit diagram for the reperforator unit of FIGURE 1.

A selective perforator apparatus, constituting a version of the present invention, is illustrated in FIGURES 1 and 3–13. This embodiment consists of a compact and complete reperforator unit 500 equipped to receive coded data and punch correlated code holes in record media such as tape, cards or fanfold records. The machine is equipped with mechanism and controls which may be set to enable operation with record media having prepunched feed holes or it may operate with record media requiring feed holes to be punched by the machine 500. The epicyclic rotation in a planetary assembly, such as used in the first embodiment disclosed in parent application Serial No. 157,540, is also utilized in the reperforator 500, although in a slightly different manner. Herein, hypocycloidal peak movements of planetating components are utilized to impart operational power to selected punch mechanism, selection being accomplished by means not a direct part of the planetary system, as distinguished from selective hypocycloidal phasing as disclosed in the aforenoted parent application Serial No. 157,540.

Generally speaking, the unit 500, as depicted in FIGURE 1, is a complete reperforator including power components, perforating assembly, feed means for various forms of record media and controls to enable a varied and versatile operation, FIGURE 1 primarily depicts the machine components, other than the punching and feeding mechanism, with the main control switches 504, 506 and 508 being grouped on a small panel 502 centrally located near the rear of the machine. Switch 504 is an "on-off" switch which must be turned "on" to start the machine. If feed hole punching is desired for any of the possible record media being used, switch 506, the feed hole punch control switch is turned "on." A three position record media switch 508 can be switched to either "tape," "cards" or "fanfold" position to condition the machine operation to accommodate the record medium to be used.

If the record medium is tape, the tape 510, which is pulled from a supply reel 512, passes around a vertical roller 514, through an end-of-tape switch station 516, around a tight tape switch operating roller 518 and under a first pressure roller 520. From roller 520, tape 510 passes through the perforating station where it is guided through a die block and guide located directly beneath a chad chute 522, thence under a second pressure roller 524. The tape then passes into a depending loop, the slack of which is taken up by a weighted roller 526 shiftable in a substantially vertical path above a tape take-up motor switch 528. The tape finally passes through tape guides 530 and 532 and is connected to a tape take-up reel 534 with its axis in vertical disposition and drive connected to a take-up reel drive motor 536. Tape path control circuitry utilizing the aforedescribed tape controlled switches may be any of many known constructions.

Assuming the machine is conditioned to perforate on a tape and made ready to receive coded messages as described in the preceding paragraph, perforating and feed function will thereafter occur in accord with received code information. Upon the punch motor switch 504 being turned on, the punch motor 540 (FIGURE 3) starts rotating and, through a belt 542, rotates a cam carrier assembly 544 of punch cam planetary mechanism 546.

The planetary mechanism cam carrier assembly 544 has two spaced end discs 548 and 550 non-rotatably coaxially secured on a shaft 552 which has non-rotatably secured to one of its ends, a pulley 554 rotated by means of the motor driven belt 542. Carrier assembly 544 is suitably journalled for rotation in bearings such as 556 mounted in the machine support framework. Rotatably journalled on axes located eccentric but parallel to shaft 552 and at 90° spaced apart positions between carrier discs 548 and 550 are four elongate double faced cams 560, 562, 564 and 566. Each of the cams 560–566 are non-rotatably fixed on an associated shaft 568, stub ends of which are disposed in suitable bearings (not shown) in the end discs. Adjacent one end of each cam, an associated gear 570, 572, 574 and 576 is non-rotatably secured to a respective shaft so that each set of shaft, cam and gear can rotate about its respective shaft axis as a unit and all four sets will be rotated by the carrier assembly about the axis of the carrier shaft 552.

Located adjacent one end of the carrier assembly 544, surrounding and meshed with the four gears 570–576 is a fixed stationary ring gear 578 which, in the illustrated embodiment, has three times the number of teeth present in each planetary cam gear. With a 3:1 gear ratio, the hypocyloidal path of one of the cam edges of each of the dual cams 560, 562, 564 and 566 will follow the repetitive path 580 indicated by phantom lines in FIGURES 5 and 6, passing through three equiangularly spaced hypocycloidal peak positions during one revolution of the carrier assembly 544. The opposite cam edge of each of the dual cams follows a similar hypocycloidal path 582 offset 60° from the first path 580 and thus also passes through three equiangularly spaced hypocycloidal peak positions which occur intermediate the three hypocycloidal peak positions of the opposite cam edges. Thus the two cam edges of each of the four cams pass six circumferentially spaced peripherally located peak positions during one revolution of the carrier and these positions can be used as operating positions. Only two diametrically opposite operating positions of the six positions (see FIGURE 5) are occupied by cam edges of only two opposed cams at any specific period which means three distinct sequentially timed spaced and angularly spaced camming operations can be accomplished during a 60° increment of rotation of the carrier assembly 544. Note that the cams rotate about their axes in a direction opposite to the direction of rotation of the carrier assembly so the movement of the cam edge as it passes through one of the hypocycloidal operating peaks is substantially radial with little or no components of rotational movement about the carrier axis.

Figures 5, 6:
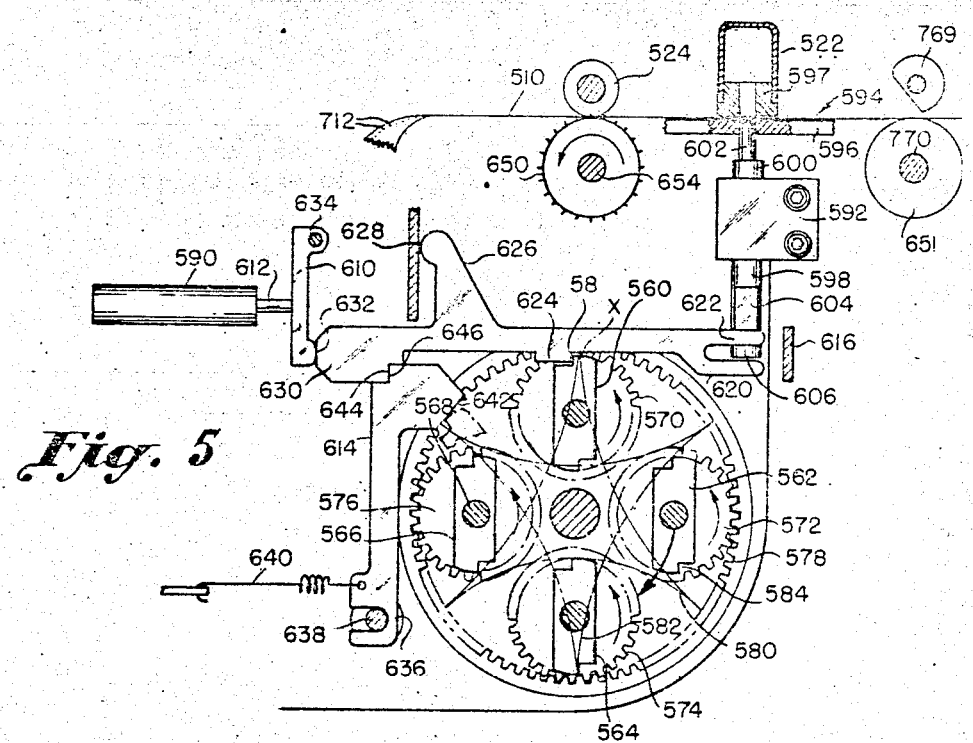
FIGURES 5 and 6 are partially sectioned evaluation views of the punching mechanism of FIGURE 3, FIGURE 5 showing components in a non-punching position and FIGURE 6 illustrating the same components in a punching position, and both views illustrating the hypocycloidal paths of the cam edges.

FIGURES 5 and 6 show that two of the six cam operating positions X and Y are utilized for certain of the punch operations. The two positions are chosen to assure that they do not occur simultaneously, in other words, one cam edge of cam 560 will move into position X at a time when no cam edge is at position Y, then the opposite cam edge of the following cam 566 moves into operating position Y 30° of carrier rotation after the preceding cam edge was at position X. Because there are four cams, this sequence is repeated once during each ninety degrees of carrier rotation, and four complete cycles of punch operation can be accomplished during each revolution of the carrier. An important aspect of the planetary arrangement is that four punch operational cycles can be accomplished during a complete rotation of the cam carrier and at the same time the length of the operating stroke of the cam is not sacrificed even though it occurs during an extremely short angular increment of carrier rotation because the stroke occurs when the cam edge follows the peak of its hypocycloidal path which results in a substantially immediate movement and removal of the cam edge to and from operational interference. This rapid and precisely positioned application of force permits high-speed opposed direct and positive punching and retracting operations through a common linkage as will be presently described.

Returning temporarily to FIGURE 3, a group of solenoids 590 are shown positioned at one side of the planetary cam system. There is a solenoid corresponding to each of the feed and code punches and the code solenoids are connected to appropriate receiver circuitry so various ones are simultaneously energized upon receipt of a code signal combination. The feed hole punch solenoid 590' (FIGURE 18) is connected in the control system circuitry in such manner that it will be energized each time a code signal group is received, so long as the aforedescribed feed hole punch switch 506 has been placed in the "on" position. If the feed hole punch switch is in its "off" position, (used whenever the record medium has been prepunched) the feed hole punch solenoid cannot be energized and there will be no subsequent actuation of the feed hole punch. Operation of any of the punches of the multiple punch perforator 500 is occasioned by momentary energization of the solenoid 590 corresponding to the desired punch. Accordingly, the punching mechanism and its operation will be described with reference to FIGURES 3, 5 and 6 for only one punch.

*Punch mechanism and operation*

Figure 3:
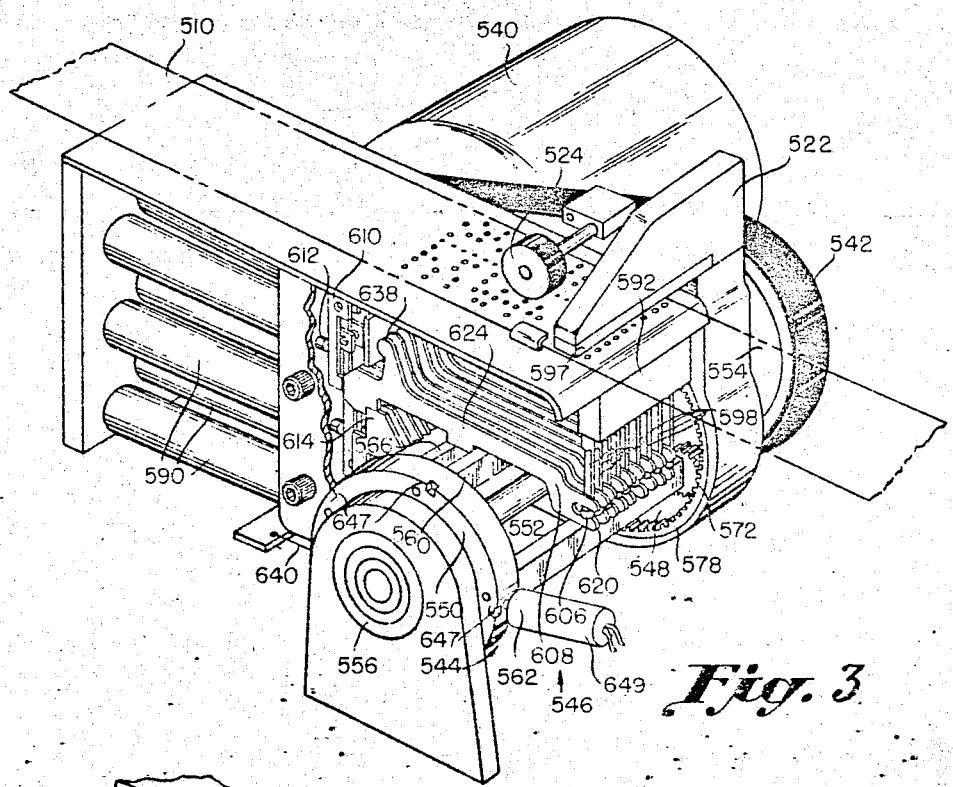
FIGURE 3 is a perspective detail view showing the compact arrangement of multiple punches, punch levers, selector solenoids, planetating mechanism and drive motor as utilized in the machine of FIGURE 1.
Figure 4:
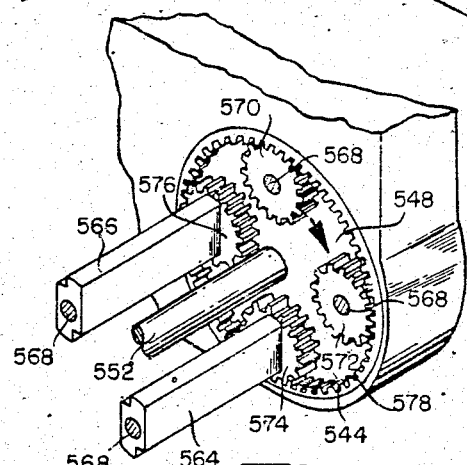
FIGURE 4 is a detail perspective view illustrating two of the four cams, the ring gear and planetary gears used in the punching machine shown in FIGURE 2.

Shown in FIGURE 3, a group of punches, nine including the feed hole punch are reciprocally mounted in alignment in a punch guide 592 rigidly secured to the machine frame. Above the punch guide is the tape guide and die assembly 594 (FIGURE 5), the lower guide plate 596 of which is coplanar with the flat table top of machine 500 forming the record medium track, and the chad removal tube 522 abuts over the chad exit portion of upper die plate 597.

More clearly shown in FIGURE 5, each of the punches 598 have a heavy shank 600 and a punch end 602, the shanks 600 being guided for vertical sliding movement in the punch guide 592 and the punch ends 602 being guided in the lower die plate 596. Although the perforating components and planetary cam operators are sufficiently rugged and powerful to operate all punches simultaneously, if desired, the individual punches could be operated in rapid sequence. One way to accomplish this relationship would be for the punch set to have the punch ends ground at an angle canted from a plane normal to the punch axes so all punches will be of slightly different lengths. A similar punch set is fully described in copending United States application Serial No. 547,265, filed November 16,, 1955, now Patent No. 3,009,988, and results in minute increments of sequential punch initiation of a group of selectable, simultaneously shifted punches regardless of which punches are selected to reduce the high operating forces which would occur if all punches initiate penetration of the record medium at the same instant. Another way to accomplish the same effect would be to provide a slight inclination along the edges of the cams which operate the punches.

The shank ends 600 of each punch 598 are provided with a side recess 604 which provides a lateral lug 606 at the lower end of each punch. Associated with each punch 598 is a set of operating linkages including a punch lever 608, an intermediate lever 610, a plunger 612 of an associated solenoid 590 and a retracting lever 614. The plurality of punch levers 608, associated intermediate levers 610 and retracting levers 614 are mounted as an assembly in a suitable cage (not shown) with combs (not shown) to maintain each associated set of levers in coplanar paths. Punch levers 608 are permitted a lateral reciprocating motion between two stop plates 616 and 618, rigidly fixed to machine support structure, and a vertical motion with the levers pivoting about the lower edge of stop plate 618 as a fulcrum.

The right-hand end of punch lever 608 has two elongated fingers 620 and 622 forming a fork which embraces the end lug 606 of the associated punch, the fork fingers being of sufficient length to enable a slight lateral reciprocation of punch lever 608 relative to the punch lug. At an intermediate location on the lower edge of each punch lever 608 is an anvil lug 624 which, in the non-selected normal (or retract) position of punch lever 608, is disposed just to the left of the planetary cam hypocycloidal peak operating position X, at which position the anvil will not interfere with the hypocycloidal path of the edges of the planetating cams. An arm 626 projects from the upper edge of punch lever 608 and terminates in a curved abutment end 628 located adjacent the left-hand stop plate 618 and is utilized during a retract operation as will be hereinafter described. The extreme left end 630 of punch lever 608 is an abutment head aligned in the path of a cooperative abutment head 632 at the free end of an associated intermediate lever 610 pivotally mounted at its other end on a pivot shaft 634 which is disposed normal to the punch levers. The intermediate levers are of different lengths to accommodate the different locations of the solenoids 590 within the assembly of solenoids. With such an arrangement, energization of a selected associated solenoid 590 moves the solenoid plunger 612 to the right, pivoting the intermediate lever 610 counterclockwise to abut and shift the punch lever 608 to the right of its operative position as determined by abutment of the fork fingers 620, 622 with plate 616 (see FIGURE 6). In its selected operative position, punch lever anvil 624 will be now disposed in the hypocycloidal peak path of a cam edge a short distance below the upper limit of peak point X and as the next cam edge passes through point X, punching actuation will occur, as will be described.

The retracting levers 614 are pivoted at their lower slotted ends 636 on a common pivot pin 638 having a plurality of radial comb slots, each lever 614 being maintained in a comb slot of pin 638 by a spring 640. The upper ends of the retracting levers include an anvil impact head 642 and a notched portion 644 which is interlocked with a complementary notched portion 646 on the associated punch lever 608. The normal position of the retracting lever anvil head 642 (FIGURE 5) is out of the path of a planetating cam (one shown in phantom lines) as it passes the operational position Y. However, when an energized solenoid 590 has shifted its punch lever 608 to the right (FIGURE 6), the interlocking notches 644 and 646 of levers 608 and 614 will force the associated retracting lever 614 clockwise about its pivot to place the retract anvil head portion 642 into the hypocycloidal peak path of the planetating cams at operational position Y.

The slotted end connection 636 of each retracting lever 614 being biased onto the pivot shaft 638 by spring 640 aids in ease of assembly and provides an impact absorbing connection preventing the forces resulting from impacts on the anvil portion 642 from creating a high moment couple about the pivot shaft 638. However, if desired, a straight pivot pin could be used with spacers and the retracting levers could have ordinary pivot apertures.

Indexing is provided by using one of the planetary assembly end discs 550 as a clock with four slots 647, 90° part and an induction coil head 649. Impulses are generated in coil 649 each time the planetary cam assembly 544 passes a position where a selection is permitted by the angular location of the four cams.

Punch operation

Upon receipt of the incoming code signal group from a controlling source 648 (FIGURE 18) as permitted by an index pulse from head 649, code punch selecting solenoids 590 corresponding to the code signal group are simultaneously energized (see FIGURE 6). The solenoids 590 vary in number depending on the number of punches 598 or code units being used (for instance, the 5 unit Baudot code or 8 unit data processing code). When a solenoid 590 is energized, its plunger 612 moves out and pushes the associated intermediate lever 610 and it, in turn, pushes the end 630 of associated punch lever 608 instantly moving the punch lever 608 to the right, positioning punch lever anvil 624 into an interference condition with a punch cam 560, 562, 564, or 566 determined by the forked end of the punch lever striking stop bar 616.

The punch motor switch 504 being turned to its "on" position, the planetary cam system 546 will be operating so the gears 570, 572, 574 and 576 on the ends of each dual punch cam 560–566 which mesh with fixed ring gear 578 cause portions of each of the punch cams to pass through a hypocycloidal path.

FIGURE 5 shows one cam edge of cam 560 missing the anvil 624 of a non-selected punch lever 608. However, if punch lever 608 had been selected and shifted to the right by its energized solenoid 590 (see FIGURE 6), then as cam 560 comes around to the operating position X its cam edge strikes the anvil 624 of punch lever 608, moving the punch lever 608 counterclockwise instantly about the lower fulcrum edge of stop plate 618 and punch lever fork finger 620 interlocked with lower lug 606 of associated punch 598 causes the punch to move upward in punch guide 592, and force its end 600 through tape 510 and up into the punch die 597 to thereby punch the proper code hole 650 (see FIGURE 3). If tape feed punch switch 506 is "on" a tape feed hole is simultaneously punched in the manner just described.

An instant later, 30° of carrier rotation, the opposite cam edge of the next cam 566 strikes the anvil 642 of retracting lever 614 which shifts the lever about the pivot pin 638 and, being interlocked with punch lever 608, imparts a rapid movement of the punch lever 608 to the left to its normal non-selected and inoperative position. During the leftward movement of lever 608, projection 626 on the top edge of the punch lever 608 is moved to the left until its end abutment 628 strikes the stop plate 618, whereupon it becomes a punch lever fulcrum, and causes the punch lever 608 to pivot in a clockwise manner around the end abutment 628, moving the forked lever end clockwise so upper fork finger 622 positively pulls the punch 598 downward and out of the tape. An instant later the tape feed mechanism, now to be described, is operated through a feed step cycle.

*Feed mechanism and operation*

Primary feed and back spacing of the record medium, whether it be tape, cards or fanfold, is accomplished by means of an indexed rotatable sprocket feed roller 650, as seen in FIGURE 13, located below the record media track and positioned just after the punching station. A preliminary indexed feed wheel 651 as will be hereinafter described, is also used in the card and fanfold modes of operation. A plurality of feed pins 652, secured in the periphery of feed roller 650 engage properly spaced feed holes in the record medium so that stepped rotation of roller 650 causes a stepped feed movement of the record medium. The distance of each step movement of the feed roll moves the tape a distance equal to the spacing between adjacent feed pins so that feed holes punched between each feed step are properly spaced. Pre-punched feed holes must, of course, be spaced to fit the stepped feed movement. Similarly, stepped back-spacing movement of the feed roller 650 will back-space the record medium.

The mechanisms by which stepped feed and stepped back-spacing are accomplished are inter-related and are illustrated in FIGURES 7–13. All of these figures appear as viewed from the rear of the machine 500. The sprocket feed roller 650 is non-rotatably secured on the end of a shaft 654 which is suitably journalled for rotation in the machine support structure. Rotational power is supplied to feed shaft 654 from the punch motor 540 through a stepped down gear transmission 656 to the input member 658 (a gear) of a friction slip coupling 660, the output of which is drive connected to the feed shaft 654. Also non-rotatably secured on feed shaft 654 are two ratchet toothed wheels 662 and 664. Wheel 662 serves as an escapement wheel which provides motor powered, escapement stepped rotation of feed sprocket 650 through the friction slip coupling 660. Ratchet wheel 664 serves as a pawl driven wheel, the operation of which is against the rotational force transmitted through the slip coupling 660 to rotate the feed sprocket in a reverse direction.

The organizational relationship of the stepped feed escapement mechanism and the back-spacing mechanisms is shown in the skeletonized perspective FIGURE 13 which also illustrates the location of one set (the feed punch set) of the punch operating linkages. The feed escapement mechanism will be described with reference to FIGURES 7–9 and FIGURES 10–12 will be used in describing the back space mechanism. Both mechanisms are cocked by associated individually energized solenoids 663 and 665 and both mechanisms are mechanically triggered by camming action of a roller 666, four of which are carried on and eccentric to the axis of a roller wheel 668. Roller wheel 668 is rotated by means of one of the intermediate gears in train 656, at a speed at least approximately three times the rotational speed of the planetary carrier assembly 544 to assure that one of the four rollers 666 passes an operational camming position during each 30° of rotation of the carrier assembly thereby assuring that a feed escapement step can be accomplished during the time period when the planetary cam carrier assembly 546 rotates the 60° which is provided between a punch retraction operation and the next succeeding punch operation.

The feed escapement mechanism consists of the feed solenoid 663, its plunger 670, a cocking lever 672 which is in the path of and is pivoted to a latched cocked position by movement of plunger 670 when the feed solenoid is momentarily energized. Cocking lever 672 is pivoted at its lower end on a fixed pivot pin 674 and at its upper end pivotally carries a double armed latching lever 676. The right-hand edge of cocking lever 672 has two spaced apart fingers 678 and 680 embracing a horizontal guide post 682 and absorbing a major portion of the shock of impact of a roller 666 against a cam projection 684 on the left-hand edge of the cocking lever 672, which projection 684 is moved into the path of rotation of the rollers when the lever is cocked. The upper finger 680 terminates in a hook lug 686 which engages the head 688 of a position limit screw to determine the cocked limit position of the cocking lever 672.

A double toothed escapement lever 690 is pivoted on a pivot pin 692 fixed in the machine frame, so its two escapement teeth 694 and 696 can be rocked alternately into and out of engagement with the peripheral teeth of escapement wheel 662. The lever 690 is biased clockwise by a spring 698 so its lower tooth 694 normally engages a tooth of wheel 662, and blocks rotation of the escapement wheel. Escapement lever 690 includes a depending arm 700 which terminates in a bent latching lug 702. This lug, in normal position of the escapement linkage, is positioned immediately above a latch hook 704 on one arm of the latching lever 676. The latching lever 676 is biased in a clockwise direction by a spring 708 so its other arm 706 abuts the end of a position limit adjustment screw 710. Through the articulation connection of the latching lever 676 and the cocking lever 672, which pivotally carries the lever 676, the force of spring 708 tends to pivot the lever 676 counterclockwise (when viewed from the rear as in FIGURES 7–9) about its abutment with screw 710 and also urges lever 672 to its retracted position which maintains the hook end 704 of latch lever 676 spaced just below the latch lug 702 of the escapement lever 690.

*Tape feed operation*

As has been previously described, tape feed occurs immediately after retraction of the punch levers and punches, at which instant the controlling unit 648 by a one shot signal pulse causes the tape feed solenoid 663 to be momentarily energized, whereby plunger 670 presses against the tape feed cocking lever 672 moving it counterclockwise (see FIGURE 8) and forcing cam projection 684 into the rotating path of a roller 666 on roller wheel 668. The wheel 668, when power is "on," rotates continuously in a counterclockwise direction. As tape feed cocking lever 672 pivots counterclockwise toward cocked position, it shifts the latching lever 676 attached to its upper end, toward the left, i.e., in the same counterclockwise direction, which moves the lever arm 706 from abutment with limit screw 710. As hook end 704 of latch lever 676 moves past the latch lug 702 of escapement lever 690, the latching lever 676 can now pivot clockwise, urged by its spring 708 into a position in whitch latching lever 676 and escapement lever 690 become latched. Bearing in mind that the solenoid 662 is no longer energized, the moment after this latching occurs, one of the rollers 666 will strike the cam projection 684 on the tape feed cocking lever 672, instantly and positively pivoting the tape feed cocking lever clockwise to its retract position. This retract movement, in turn, moves latching lever 676 in a clockwise direction about the cocking lever pivot 674. Due to its being latched with escapement lever 690, the initial retraction movement of latching lever 676 will positively pivot the escapement lever 690 counterclockwise to disengage the lower tooth 694 from blocking engagement with a tooth of tape feed escapement wheel 662 on the feed shaft 654.

Because the feed shaft 654 with the tape feed sprocket 650 is friction coupled through slip clutch 660 (FIGURE 13) to motor 540, the feed shaft 654 will instantly start to rotate when the lower tooth 694 of escapement lever 690 is disengaged from the tape feed escapement ratchet 662. However, the shaft 654 will stop rotating almost instantly because clockwise movement of the latching lever 676 which disengages lower escapement tooth 694 causes upper escapement tooth 696 to engage a tooth and block further rotation of the tape feed escapement ratchet wheel 662. Continued shifting of the latching lever 676 clockwise by pivoting of cocking lever 672 causes its upper arm 706 to abut the limit stop screw 710 which cams the hook end 704 of lever 676 down away from its latched engagement with escapement lever 690 clockwise, disengaging upper tooth 696 and re-engaging the lower escapement lever tooth 694 with the tape feed escapement ratchet 662, at which stage the tape feed wheel has been indexed one step.

It should be noted that the two engaged teeth on the tape feed ratchet wheel 662 are each indexed one-half a tooth space during each operation of the escapement, and therefore the total rotation of the tape feed sprocket 650 is one feed step. The pins 652 in the tape feed sprocket 650 engage the tape 510 through tape feed holes 712 (see FIGURE 5) and in this manner, the tape 510 is indexed after each printing operation.

Back-spacing

The mechanism for back-spacing will be described with primary reference to FIGURES 10, 11 and 12 which clearly illustrate that the back spacing mechanism utilizes a solenoid 665, a plunger 720, a cocking lever 722 pivoted on shaft 674 and having guide fingers 724 and 725 and a cam abutment projection 726, and the cocking lever 722 pivotally carries at its upper end a latching lever 728 which has a hooked end 730 and an upper arm 732 biased by a spring 734 and abutting an adjustable screw limit stop 738. The foregoing back-spacing components are substantially identical to the corresponding feed mechanism components. As with the escapement cocking lever 672, the two fingers 724 and 725 on the back-spacing cocking lever 722 embrace the guide post 682 and the upper finger 725 has an end hook which engages behind the head of a screw adjustment member 738 to limit the cocked position of lever 722.

Pivotally mounted on pivot post 692 is an intermediate transfer lever 740 having a depending arm terminating in a bent latching lug 742 which normally is disposed just above the latch lever hook 730. The upper arm of intermediate lever 740 pivotally carries a back-space spur lever 744 having a depending combined abutment and spring anchor arm 746 and a lateral arm terminating in a spur 750. A tension spring 748 attached between fixed structure and the spur lever anchor arm 746 biases the spur lever arm 746 to a normal inoperative position against the end of an adjustable position limit screw 752 and the bias force of spring 748 also urges the intermediate lever 740 clockwise to its normal inoperative position where its upper end 753 engages a position stop plate 754. In the normal inoperative position of the back-spacing mechanism, the spur 750 is in alignment with but spaced away from engagement with the back-space ratchet wheel 664 secured to the feed shaft 654.

Back-space operation

When back-spacing is desired or becomes necessary, a back-space key 760 (FIGURE 1) located on a central panel on the top of machine 500, is pressed, it being understood that motor 540 is energized and rotating. Back tape solenoid 665 (FIGURES 10–12) is instantly energized, by means of switch 761 (FIGURE 18), and its plunger 720 will strike the back-space cocking lever 722 moving it counterclockwise (FIGURE 11) until finger hook 725 catches on limit stop screw 736. This forces cam projection 726 on the back-space cocking lever 722 into the path of a roller 666 on roller wheel 668.

During the counterclockwise cocking movement of back-space cocking lever 722 the latching lever 728 is shifted until its latch end 730 latches in front of the latch lug 742 of the intermediate transfer lever 740. Almost instantly, a roller 656 strikes the cam projection 726 kicking the back-space cocking lever 722 clockwise and it, in turn, carries the latching lever 504 with it back to normal position. However, since the latch hook 730 of latching lever 728 is latched with latch lug 742 on the lower end of the intermediate transfer lever 740, it pivots the intermediate transfer lever 740 in a counterclockwise direction. This movement shifts the back tape spur lever 744, located at the top end of the intermediate transfer lever counterclockwise and also permits it to pivot counterclockwise until spur 750 meshes with the teeth of the back space ratchet 664, the spur lever 744 being urged to pivot counterclockwise on its own pivot by spring 748. As shown in FIGURE 12, this movement of the spur lever 744 shifts the spur 750 into engagement with a tooth on ratchet wheel 664 and also rotates the back-space ratchet wheel 664 counterclockwise one tooth space, indexing the tape 510 back one step.

During back-space indexing the escapement lever 690 coacting with the escapement ratchet wheel 662 provides the detent action to retain the feed shaft in back-spacing position.

Continued pivotal movement of the back-space cocking lever 722 clockwise to its normal position (after being so propelled when roller 666 struck cam projection 726), and because the end of upper arm 732 of the latching lever 728 rides against adjustment screw 738 because it is so biased by spring 734, will cause latching lever 728 to rotate counterclockwise, releasing latch lever hook 730 from engagement with the lower end lug 742 of the intermediate transfer lever 740. Instantaneously, the intermediate transfer lever 740 will snap in clockwise rotation under the bias of spring 748 until it hits stop 754 and at the same time the lower arm 746 of the back spur lever 744, riding on adjustment screw 752, must cause lever 744 to rotate clockwise to retract the spur end 750 away from engagement with the back space ratchet wheel 664. This sequence of events is repeated until the back-space solenoid is de-energized by releasing back-space key 760.

Returning now to FIGURE 1, there is shown a back tape scale 762 which is used in conjunction with the back-space mechanism. This scale 762 is to be used by the operator to denote the number of spaces to be back-spaced and is utilized by marking the tape 510 as indicated at 764, with a pencil at "O" denoted at 766 on scale 762. After marking the tape the operator will operate the back-space key 760 and can determine how many spaces the tape has moved backward by watching position of the mark 764 on tape 510 as it moves along the scale 762. When the proper number of back-spaces have been accomplished, key 760 is released.

Upon completion of a back-spacing operation the operator can then press a delete key on his keyboard (not shown) thereby indicating, as by a specific punched code, deletion of the incorrect code holes, and normal operation may then be resumed.

During operation of the machine a chad box (not shown) inside the main machine housing will, in time, become filled and when this occurs, a signal light 768 (FIGURE 1) will flash on. The chad box of course should then be emptied. A dry form of lubricant, specifically molybdenum disulfide, applied by spraying or dipping, on the interior of the inlet of chad tube 522 above die plate 597 will assure freedom of passage of the chad through the tube. This dry lubricant prevents blocking of the chad tube which results in malfunctions of the equipment when the chad is generated at ultra-high speeds.

As described with reference to FIGURE 1, the three position switch 508 can be set on "tape," "cards" or "fanfold" although the machine has been described herein as using tape. It is well-known in the data processing field, that when single cards or fanfold records are to be used in a data processing perforator or reperforator machine they are often supplied with pre-punched feed holes. In such cases, operation of the feed hole punch is not desired. The mechanism by which punch selection and retraction is accomplished permits taking the feed hole punch out of operation merely by opening the control circuit to the feed hole punch solenoid which is done by turning the feed hole punch switch 506 to the "off" position.

On the other hand, record cards or fanfold records which are not pre-punched with feed holes can be used in the present machine and when used all punches including the feed hole punch are permitted to operate in the normal manner, the position acting rugged punch linkage and feed apparatus of this machine being completely capable of punching and accurately locating feed holes as well as the code holes in all records and cards as well as in tape. An important advantage of this feature is that the exorbitant expense of pre-punched record media can be eliminated.

The feature of punching feed holes in the cards and fanfold records is provided by the use of the aforedescribed preliminary feed wheel 651 (see FIG. 13) and a shiftable clamping D-wheel 769 (FIGURES 1, 13, 14 and 18), the mechanism and operation of which will be hereinafter described. Feed wheel 651 has a cylindrical smooth surface. The surface is not polished, one example having a phosphated finish. As clearly depicted in FIGURE 13, the pre-feed wheel 651 is located on the infeed side of the punch station and is securely fixed on a rotatable shaft 770 parallel with the feed sprocket shaft 654. The two feed shafts 654 and 770 are directly rotatably connected through the slip coupling gear 658, an idler 771 and a gear 772 on the end of shaft 770. The gear ratio is such that the peripheral speed of the pre-feed wheel 651 is exactly the same as the peripheral speed at outer circumference of the body of feed sprocket 650. Thus, if the D-wheel 769 is shifted down and clamps a card or other record against pre-feed wheel 651, subsequent feed stepping of the primary feed sprocket 650, as has been described will step feed the card or record into the punch station and up to and in engagement with the sprocket feed wheel 650 which then can assume positive step feeding engagement with the feed holes in the record.

In punching single cards, three position switch 508 is set on "card" position, and a card 776 (shown in phantom lines in FIGURE 1) is inserted into the machine from the right until the card edge abuts a retractable card stop 778. Two undercut short posts serve as card guides 780 and 782 which can be set to the appropriate width of the card 776 by rotating attached knurled wheels 784 and 786. As soon as the adjustments for cards being used have been made, a light downward pressure on the card 776 by the operator will depress a card feed plate 788 which will be covered by the positioned card. By means of electromechanical linkage (to be described) the aforedescribed D-wheel 769 is brought down until it firmly clamps card 776 against pre-feed wheel 651 and mechanical linkage will retract the card stop 778 below the top surface of the machine table 789. Retraction of card stop 778 below the table surface actuates a swich 773 which energizes a circuit to the machine controller 648 (FIGURE 18) and permits normal punching operation under control of the system controller to proceed in the manner hereinbefore described. When punching of the card is completed, an end of card feeler 774 will raise up, actuate an end of card switch 775, the card stop 778 will then raise up and its switch 773 will open to deactivate the machine.

When fanfold records are used, the three position switch 508 is set on "fanfold" position and the first fanfold record unit 790 is fed into the machine with all punches conditioned to operate normally unless feed holes are prepunched. Fanfold card 790 is inserted into the machine until a special pre-punched hole 792 slips over the operating button 794 of a fanfold sensing switch 795 which, when tripped, permits the normal punching operations to be initiated. The first fanfold card is not used for a record because its torn input edge is not a sufficiently accurate locator. The first card of the fanfold strip can therefore be random punched or fed through the machine. Upon completion of filling the first fanfold card 790, the control system will be operated to actuate the feed mechanism so the next card 796 is automatically pulled into a position where its special pre-punched hole 793 aligns with the fanfold sensing switch operating button 794. The pattern of operation will be repeated and continues so long as each card is completely filled to a predetermined condition by punching operations. In the event that a card is *not* completely filled, the machine will automatically stop upon completion of the last punched character. The operator must then press a tape feed out key 799 which, through switch 800, will automatically feed the fanfold card until the next special pre-punched hole 792 is aligned with the fanfold sensing switch button 794 whereupon tripping of the fanfold sensing switch 795 will again cause the machine to resume data punching operations.

*Record tape mechanism*

Returning temporarily to the tape mode of operation of the reperforator 500 several of the tape feed components will now be described with reference to FIGURES 1, 15, 17 and 18.

As readily apparent from FIGURE 1 and as seen in the circuit diagram of FIGURE 18, if the tape 510 breaks or the end of the supply is reached, the tape-out or end-of-tape switch 516 will open and also if the tape 510 becomes caught and tightens the tight-tape switch 518 will open. Assuming that mode selection switch 508 is placed in the tape mode, the two switches 516 and 518 will be in a series control circuit through mode switch bank 508–2, segment *b*, to the controller 648 which will be rendered inoperative to send control code signals to the reperforator if either the tape-out switch 516 or tight tape switch 518 is opened.

The reperforator punch motor switch 504 is merely an on-off switch in series with the power circuit from punch motor 540 to the A.C. power source and is not controlled by the mode selector switch 508 or the controller 648.

On the other hand, the tape take-up motor 536 derives its source of power through a circuit connected to the A.C. power and including tape slack switch 528 in series with switching contacts in mode switch bank 508–1, bridged by segment *b* in the tape position only of switch 508. Thus positioning of mode switch 508 in card or fanfold position will open the power circuit to tape take-up motor 536 and render it inoperative.

The other switch 528 in series with the mode switch 508 in the power circuit for the tape take-up motor 536 is an on-off switch spring biased to the "off" position. Depicted somewhat pictorially in FIGURE 1 and in elevation in FIGURE 15, switch 528 has an extended flag type operator 802 projected to a position under the aforedescribed weighted roller 526. Roller 526 is shaped in the manner of a spool and is guided in a vertical chute 803 which is fixed to and depends from the lower surface of the machine table 789. An opening 804 in the table 789 above the chute enables a slack loop in tape 510 to pass down one side of the chute, under roller 526 and up the other side of the chute from whence it passes around the guides 530, 532 and onto the take-up reel 534. A loose chain such as the ball chain 805 is rotatably fastened to a center axle portion of the weighted roller 526 and attached to the underside of a chute lid 806, pivotally fastened by ears 807 and a rod 808 to the underside of table 789 so the lid 806 will lay flush with the table top when in closed position. The chain 805 enables the weighted roller 526 to be raised and placed over a tape 510 to form the desired slack loop.

The tape slack loop will gradually lengthen under the force of roller 526 as tape is punched and feeds from the punching station until the roller presses the flag 802 downward to close the switch 528 and energize the tape take-up motor 536 which immediately starts to rotate the reel 534 and wind up the tape slack shortening the loop, raising the roller 526 and turning off the switch 528 to de-energize the take-up motor 536. In this manner there will always be a slack length loop of tape held only by the relatively light weight of roller 526 to permit back-spacing of the tape 510 without danger of tearing the feed holes if back-spacing had to pull the tape against the mass of the reel 534 and motor 536.

The take-up reel, as seen in FIGURE 17, is made with a depressible center post 810 fitting coaxially within a center cup portion 811 of the reel turntable 812. Turntable 812 has a hub 813 which fits over the shaft 814 of take-up motor 536 with a drive groove 815 in hub 813 interlocking over a cross pin 816 in motor shaft 814. A spring guide bushing 817 within the turntable cup portion 811 fits over a projected end of motor shaft 814 and a screw and washer secured in shaft 814 securely fastens the turntable to the motor. In such assembled position, the upper surface of the turntable 812 is flush with the top of the machine table 789.

Center post 810 has a blind bore 818 in its lower end receiving a coil compression spring 819 seated on the aforedescribed bushing 817, the spring creating a light bias force tending to project the center post 810 upward and projecting out of the turntable cup portion 811. The extent of movement of the centerpost 810 into and out of the cup portion is limited by three Z-slots 820 (one being shown) in the side wall of the cup portion which provide guide paths and upper and lower locking slots for shouldered screws 821 fastened through the Z-slots into the body of center post 810. A slight twist of the center post 810 will unlatch it from an operative extended positioned whereupon a pressure downwardly and a further slight twist will latch the post in a depressed position where its top end will be flush with the machine table 789 as is desired whenever the mode of machine operation is for record cards or fanfold.

The side surface of the upper end of center post 810 is provided with several axial slots 822 to receive the leading end of a tape record.

Ease of removal of a roll of record tape from reel 534 was a primary purpose for developing the depressible center post. An operator merely has to place his thumb on the center post, depress it and grasp the roll of record tape between his thumb and forefinger, thereby effectively eliminating the danger of spilling a roll of tape.

A final rather simple but operationally important aspect of the tape take-up reel 534 is the provision of a snap-on reel cover 823. Cover 823 has secured coaxially on its underneath side a large circular spring fingered snap fastener 824 which can be pressed into an axial annular flange 825 formed by a recess in the projected end of the center post 810. The cover is a safety precaution because the reperforator 500 may be installed in a drawer of a machine desk and, should the take-up roll of tape record start to "cone" outside of the drawer, it could be spilled, torn and ruined by opening the drawer. The cover 823 very simply prevents any degree of coning of the record tape roll.

*Record card and fanfold mechanism*

In the foregoing description of record card operation, brief reference was made to the adjustable card guides 780 and 782. Both guides are identical and are used to engage one edge and guide either the cards or a fanfold record strip in a straight path through the punching station. In so doing, the guides also create a light downward pressure on the record to prevent any tendency for the records to lift up and away from the guides. Because both guides are identical, only guide 780 will be described in detail with reference to FIGURE 16.

The main guide body 828 is a flat disc with an annular radial flange constituting a knurled operating wheel 784 projecting through a side wall slot as clearly seen in FIGURE 1. The upper surface of a guide body 828 is disposed flush with and within a circular cutout 829 in the top of the machine table 789. A stud 830 is tightly press fit in a bore 831 in the underside of the guide body 828 and passes through a hole in the machine frame 832 to support and rotatably journal the guide 780. The body 828 has a shallow boss 833 resting against a washer placed over stud 830 and on the frame support 832. Stud 830 projects through the hole in frame 832 and its threaded end carries two nuts 834 and 835 which lock and hold flat washers 836 and spring washers 837 in a compression fit against the underside of frame support 832. The compressed spring washers provide the necessary friction fit which holds the rotational position of the guide body 828 to any adjusted position.

Each guide body has an eccentrically positioned guide button 838 projected upwardly and carried on the end of a small close wound spring coil 839. Coil 839 projects into a bore 840 in guide body 828 and is secured with a set screw 841. The upper end of bore 840 terminates in a recess 842 somewhat deeper than the thickness of a record card. A blind bore 843 in the under-side of button 838 enables the button to be pressed, with a twist in the direction of the coils, over the end of coil spring 839 until a bottom cylindrical portion 844, also slightly deeper than the thickness of a record card but substantially smaller in diameter than the recess 842 fits with side clearances down into the recess 842. The bottom of button 838 may or may not touch the base of recess 842 but preferably it does not quite touch thereby permitting a sligh oscillatable flexing movement. When the guide 780 is adjusted to move the frusto-conical surface 845 of the button 838 against the edge of a record card, the card is thus urged snug against the table top as its edge passes under the frusto-conical surface 845 and abuts the cylindrical surface 844 and the slight flexing of coil stud 839 places a small bias force against the record card holding the engaged edge down and urging the record card snug against a back guide plate (not shown). The disclosed button shape will not bind the guided edge of the record card.

*Preliminary feed mechanism*

As was previously described, when this machine 500 is in the card or fanfold mode of operation, as determined by mode switch 508, the first fanfold record or a card is inserted (FIGURE 1) until it abuts the card stop 778. A palm plate 788 is then operated, resulting in a machine operation which brings the pre-feed D-wheel 769 down and clamps a record card against pre-feed wheel 651, simultaneously withdrawing the card stop 778 and permitting perforator operation to commence. FIGURES 13 and 14 illustrate the mechanism for accomplishing such action and FIGURE 18 shows suitable circuitry.

Referring to FIGURE 18, placing of the mode switch 508 in either a card or fanfold position will set up a circuit, through the mode switch bank 508–2, segment c, to a −24 volt potential, controlled by the two-position end-of-card switch 775 and the open-close palm switch 848.

Shown in FIGURE 14, the palm switch plate 788 has an arcuate contour which raises it slightly above the surface of table 789. Plate 788 has a depending stud 849 guided for vertical movement in an aperture 850 in the machine frame 832. A clip 851 on the lower end of stud 849 limits upward movement of plate 788 and a light compression coil spring 852 biases the plate upwardly. Palm switch 848 is mounted directly under the plate stud 849 so that pressure on palm plate 788 will actuate the switch 848 to a closed position. The end-of-card switch 775 is mounted under the table 789 and is shown at the left of FIGURE 14, its operating pin 853 being lightly biased upwardly with just sufficient force to support the end-of-card feeler wire 774 in a raised position so it projects through a hole 854 in the table adjacent the feed sprocket. End-of-card switch 775 is normally biased to the position shown in FIGURE 18 and is actuated to its other position solely by the weight of a card or fanfold record on the curved end of the feeler wire 774.

Seen in FIGURE 14 is a solenoid 855 which will be referred to as the card clamping solenoid. The solenoid plunger 856 projects upwardly, terminating in a fork fitting 857 with a cross pin 858, being biased upwardly by coil spring 859. The lower end 860 of the solenoid plunger projects from the bottom of the solenoid and serves as the actuator for the aforedescribed clamping solenoid switch 773.

Plunger cross pin 858 projects through a vertical slot 861 in a horizontal lever arm 862, the bent end of which terminates in the aforedescribed, upwardly disposed card stop 778. Lever arm 862 extends from one side of a U-bracket 863 which is pivotally mounted on a fixed rod 864 and provides an anchor for one end of a tension spring 865 which biases the U-bracket and its lever arm 862 counterclockwise (FIGURE 14), i.e., against the upward bias of the solenoid spring 859. The solenoid spring 859, exerts a force which overpowers spring 865 and thus the cross pin 858 engages the upper end of slot 861 in the lever arm 862 to normally maintain the card stop 778 projected above the surface of table 789 (see FIGURES 1 and 14).

On the other side of U-bracket 863, an L-shaped lever arm 866, extends upward to a position above the table and then horizontally to a location above the pre-feed wheel shaft 770 (see FIGURE 13). Best shown in FIGURE 13 is a horizontal stud 867 rigidly secured in the end of the L-lever 866 and projecting parallel to and above the axis of the pre-feed wheel 651. Journalled on a reduced end of the horizontal stud 867 is the aforedescribed card clamping D-wheel 769, held axially in position on the stud, directly vertically above pre-feed wheel 651, by suitable means such as a retaining screw 868 in the end of stud 867.

The D-wheel 769 is depicted in FIGURES 13 and 14 in its normal, disengaged position in which it is biased under the biasing force of a light torsion spring 869 on the stud so that a horizontal pin 870 fixed in the rear face of D-wheel 769 is abutted to a limit position against a lug 871 fixed in stud 867. As seen from the rear, in FIGURE 13, the D-wheel is biased in a clockwise direction (as seen from the front, in FIGURE 14, it is biased in a counter-clockwise direction) by a torsion spring.

With specific reference now to FIGURE 14, it will be seen that the periphery of D-wheel 769, from location A to location B, is cylindrical and should occupy approximately ¾ of the circumference. Substantially all of the remaining periphery of the D-wheel is a flat surface 872. The intersection between the flat surface 872 and the cylindrical portion results in an intentional rather sharp line at A which, in the normal disengaged and biased position of the D-wheel is disposed a slightly spaced distance above the cylindrical surface of the pre-feed wheel 651 to permit free passage of a record card. The other intersection of the flat surface 872 is faired in a smooth curve 873 between points C and B for a purpose to be described. Note, line P in FIGURE 14 is the center line of the punches.

When clamping solenoid 855 is energized, by circuitry as will be described, the plunger 856 is pulled downward and together with the bias force of the bracket spring 865 causes the card stop 778 to drop below the table surface. The same force and action simultaneously lowers the D-wheel 769 to clamp a record card against the pre-feed wheel 651. The energized limit position of solenoid plunger 856 is adjusted to place the cross pin 858 in abutment at the bottom end of lever slot 861 when the D-wheel is in clamping engagement with a record card and, at such limit position, the lower plunger end 860 has actuated the clamping solenoid switch 773.

With the D-wheel lowered to clamping position, and the card stop withdrawn the reperforator can be operated by the system controller 648 and each cyclically indexed feed step will cause the pre-feed wheel 651 to rotate an incremental angular step. The record card will be moved past the punch station P in precise feed steps under control of the pre-feed wheel and D-wheel 769 which is tightly clamped against the record card. The D-wheel will be rotated an equivalent angular increment against the light torsion bias of its spring 869 by rolling action as the record card moves.

During feed indexing of a record, under control of the pre-feed wheel 651, the punches (assuming the record is not pre-punched) will be punching accurately located and spaced feed holes in the record. If feed holes are already pre-punched, the feed punch actuation will be deleted by opening the aforedescribed switch 506. In either situation the record is stepped by the pre-feed mechanism for each punching cycle until its first feed hole is located in position to be engaged by a pin in the primary feed sprocket 650. The feed holes will be in proper coincidence position because the card stop 778 assured that the first feed hole of pre-punched records and the first hole punched into blank records was so located that subsequent indexed stepping of the record is exactly correlated with sprocket feed pin index steps. It will be recalled that peripheral movement of the primary feed sprocket 650 and of the pre-feed wheel 651 are in a 1:1 ratio.

When the record has been stepped a sufficient distance so the feed sprocket pin 652 engage the feed holes, D-wheel 769 has rotated into an angular position placing the flat surface 872 adjacent the record where it can no longer tightly clamp against the record card. Pre-feed stepping by pre-feed wheel 651 will then terminate, even though the pre-feed wheel 651 continues its stepped rotation. At the termination of pre-feed the D-wheel 769 undergoes a slight drop permitted because the flat surface 872 is adjacent the record card and the slot 861 in lever 862 permits such a movement of the entire bracket 863 under the bias force of spring 865 and beyond the clamp action of the solenoid. The D-wheel as seen in FIGURE 14 cannot rotate in a feed direction counter-clockwise beyond the point where the flat surface 872 is at its lower horizontal disposition, because the D-wheel stop pin 870 (FIGURE 13) will have rotated to abut the other side of stop lug 871. On the other hand, the flat surface 872 now serves as a pressure foot biased only by spring 865 against the record card which slides under the D-wheel as it feeds on through the machine.

The purpose of the faired curve 873, between points B and C on the out feed side of the D-wheel flat surface 872, is to assure that the D-wheel will not regrip the record and start a reverse rotation during any backspacing of the record. Such action is not desired because, if the D-wheel were to be reversely rotated while clamping a record, its rotation would very quickly be blocked when its limit pin 871 abutted the stop lug 871 and the record would jam or be torn as the feed sprocket 650 continued to index backwards.

Referring to the circuit diagram of FIGURE 18 it will be seen that when a single record card or a fanfold record is placed in start position against the card stop 778, the various switches 508, 775, 848 are in the illustrated positions. The operator will momentarily close the palm switch 848, energizing the grounded coil of an intermediate relay 874 by means of a circuit through one side of the end-of-card switch 775 thence to mode switch bank 508–2, segment c to a negative 24 volt potential. As soon as relay 874 is energized, a self holding circuit paralleling the palm switch 848 is made through relay switch contacts 875, the end-of-card switch 775 and thence to the same source of potential.

When relay 874 is energized, a second set of switch contacts 876 are closed to complete a circuit through the same mode switch bank 508-2, segment c from the negative 24 volts, through a normally closed set of clamping switch contacts 877, through the coil of clamping solenoid 855 to ground. This causes energizing the coil of the clamping solenoid at full potential. When so energized, clamping solenoid 855 effects lowering of the card stop 778 and positively places the D-wheel 769 in its clamping position. Operation of solenoid 855 simultaneously opens contacts 877 and completes a circuit to permit operation by the system controller 648 by closing a second set of contacts 878. When contacts 877 are opened, the clamping solenoid coil still remains energized, although at a reduced potential, through a by-pass resistor 879 in parallel with contacts 877.

The controller 648 is now operative and the reperforator can start punching operation cycles which step the record along the table, passing it over the end-of-card feeler 774 which actuates the end-of-card switch 775 to its other position, closing contacts 880 to provide a by-pass circuit from the potential at mode-switch bank 508-2, segment c, to the card clamp solenoid. When end-of-card switch 775 is actuated, the holding circuit to the coil of the intermediate relay 874 is opened, thus the card clamping solenoid is now under sole control of contacts 880 in the end-of-card switch 775.

After the record card or the end record of a fan-fold strip passes over the end-of-card feeler 774, the feeler is released and will raise to permit biased return of the end-of-card switch 775 to normal position, breaking the circuit to the card clamping solenoid 855, permitting switch contacts 877 to close in preparation for the next starting operation, opening the contacts 878 which through a circuit in the controller 648 prevents further reperforator operation, and permiting the card stop 778 and the D-wheel 769 to return to normal start positions.

The instant that D-wheel 769 raises away from the pre-feed wheel 651 its torsion spring 869 snaps the D-wheel 769 back to the normal position as seen in Figure 14. The machine will now be conditioned for the next card or first record of a fanfold strip to be inserted. Note that a positioning of the mode switch 508 to a tape mode will open the clamping circuit from the negative 24 volt potential through mode switch bank 508, segment c to the palm switch and preliminary feed operation then cannot be initiated during the tape mode of machine operation.

In FIGURES 1 and 18, there is shown a punch lockout key switch 800 which is used only in the event that certain code characters are not wanted when a special code group is being punched. If for instance, a tape was desired to be punched without certain symbols, e.g., the usual tab, letters, figures or spacing symbols, then the punch lockout key 800 would be pressed to energize a special electronic circuit in the controller 648. Such special circuits will electronically prevent energizing of punch solenoids for certain code signal combinations presented to the sensing mechanism of the machine 500.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A recording device for receiving coded data information signals and recording manifestations of such data information on a record medium, comprising:
 (a) a planetary mechanism including at least a carrier, a ring type sun gear and at least one planet component comprising a recording operator means rotatably mounted on said carrier and in gear meshed drive with said sun gear to that each rotation of said carrier causes said recording operator means to pass through at least one repetitive multiple peak cycloidal path;
 (b) power means including an electric motor and drive means connected between said motor and said carrier to provide continual rotation of said carrier when said motor is energized;
 (c) recording mechanism, adapted to impart record data on a record medium positioned adjacent said planetary mechanism, including at least one recording means disposed approximate the circular path which includes all of said cyclodial peaks and normally located adjacent a position of intersection with a peak of said cycloidal path;
 (d) selecting means coacting with said recording means enabling a relative repositioning of said recording means into a predetermined cyclodial peak in the path of movement of said operator means to assure operative engagement of said operator means with said recording means at one of said cyclodial peak positions with a subsequent resetting of the position of said recording means to avoid operative engagement between said recording means and an operator means as the latter moves through the said one cyclodial peak; and
 (e) feed means enabling a relative movement between a record medium and said recording mechanism to enable a successive spaced recording of data on the record medium.

2. A recording device for receiving coded data information signals and recording manifestations of such data information on a record medium, comprising:
 (a) a planetary mechanism including a plurality of recording operator means each of which passes through a repetitive multiple peak cycloidal path;
 (b) power means connected to rotate said operator means about the axis of the planetary mechanism and simultaneously planetating all said operator means so that each said operator means follows a said cycloidal path;
 (c) recording mechanism adapted to impart record data on a record medium positioned adjacent said planetary mechanism, said recording mechanism comprising a plurality of code punch and die sets with independent operating linkage, a portion of each operating linkage being an impact transfer lever, and all of said impact transfer levers being disposed approximate the circular path which includes all of said cycloidal peaks and normally located adjacent a position of intersection with a peak of said cycloidal path;
 (d) selecting means enabling a relative repositioning of selected ones of said impact transfer levers relative to the cycloidal paths of movement of said operator means to assure operative engagement of said operator means with said recording means at one of said cycloidal peak positions for accomplishing a desired operation of code punches representative of a specific punched code signal;
 (e) said selecting means including means in the operative linkage of each said code punch and die set operative subsequent to operative engagement by an operator means to immediately retract the punch from an operated position and to enable a relative repositioning of selected ones of said impact transfer levers and the cycloidal paths of movement of said operator means to avoid operative engagement between said impact transfer levers and an operator means during subsequent passage of said operator means through the said one cycloidal peak; said retract means comprising:
  (1) a retract member for, and interlocked with, each said transfer lever and shiftable upon operative punching movement of said transfer lever into a position of intersection with a cycloidal peaking location of an operator means which upon engagement with said retracting member forces it and said associated transfer lever and punch to a retracted position; and
(f) feed means enabling a relative movement between a record medium and said recording mechanism to enable successive spaced recording of data on the record medium.

3. A recording device as defined in claim 2, wherein:
(a) means, including a resiliently biased lost motion pivot connection, are provided for each retract member and mount said retract members in a manner to at least partially absorb impact forces from engagement by an operator means.

4. A recording device for receiving coded data information signals and recording manifestations of such data information on a record medium, comprising:
(a) a planetary mechanism including as a planet component at least one rotatable member having elongate shape along its planet axis;
  (1) said rotatable member being an elongate member with at least one camming surface disposed parallel to and eccentric of the planet axis of the rotatable member, said camming surface constituting a terminal portion operator means which passes through a distinct repetitive cycloidal path during rotation of said planetary mechanism;
(b) power means connected to rotate said operator means about the axis of the planetary mechanism and simultaneously planetating said operator means to follow said cycloidal path;
(c) recording mechanism adapted to impart record data on a record medium positioned adjacent said planetary mechanism and including a plurality of recording means, each of which includes actuating linkage, at least a portion of which is shiftable into an operative position in the path of a cycloidal peaking position of said camming surface;
(d) selecting means including power means individual to each recording means adapted to engage and shift selected ones of said linkage portions into their operative position, thereby enabling a selective relative repositioning between said recording means and the cycloidal path of movement of said operator means to assure operative engagement of said operator means with said recording means at one of said cycloidal peak positions with a subsequent resetting of the relative positions to avoid operative engagement between said recording means and an operator means as the latter moves through the said one cycloidal peak; and
(e) feed means enabling a relative movement between a record medium and said recording mechanism to enable successive spaced recording of data on the record medium.

5. A recording device as defined in claim 4, wherein:
(a) said selecting means includes a plurality of solenoids equal in number to said plurality of recording means, each solenoid being disposed to engage and shift an associated one of said shiftable linkage portions upon being energized in accord with a received code signal combination.

6. A recording device for receiving coded data information signals and recording manifestations of such data information on a record medium, comprising:
(a) a planetary mechanism including as a planet component at least one rotatable axially elongate member with:
  (1) a terminal portion comprising an elongate camming surface parallel to and eccentric of the planet axis of the rotatable member constituting a recording operator means which passes through a predetermined and fixed distinct repetitive cycloidal path during rotation of said planetary mechanism;
(b) power means connected to rotate said operator means about the axis of the planetary mechanism and simultaneously planetating said operator means to follow said cycloidal path;
(c) recording mechanism adapted to impart record data on a record medium positioned adjacent said planetary mechanism and including a plurality of perforator code hole recording means, and a feed hole recording means, each of which recording means has actuating linkage, a portion of which is shiftable into an operative position in the path of a cycloidal peaking position of said camming surface;
(d) selecting means, adapted to engage and shift selected ones of said shiftable linkage portions of said code hole recording means into its operative position, and to invariably shift the said shiftable linkage portion of said feed hole punch recording means into its operative position upon receipt by the recording device of a code signal combination, and thereby enabling a relative repositioning between said recording means and the cycloidal path of movement of said operator means to assure operative engagement of said operator means with said recording means at one of said cycloidal peak positions with a subsequent resetting of the relative positions to avoid operative engagement between said recording means and an operator means as it moves through the said one cycloidal peak; and
(e) feed means enabling a relative movement between a record medium and said recording mechanism to enable successive spaced recording of data on the record medium.

7. A recording device as defined in claim 6, wherein:
(a) said selecting means includes a plurality of solenoids equal in number to the number of recording means, individual solenoids being selectively energized upon receipt of a code signal combination and associated with individual linkage portions of said recording means to shift said linkage portions to operative position upon selective energization of said solenoids;
  (1) one of said solenoids being a feed punch solenoid and having a control circuit enabling energization of said feed punch solenoid every time a code signal combination is received.

8. A recording device as defined in claim 7, wherein said feed solenoid control circuit includes:
(a) an auxiliary control device for opening said control circuit to disable feed punch operation during operation of said recording device.

9. A recording device for receiving coded data information signals and recording manifestations of such data information on a record medium, comprising:
(a) a planetary mechanism including at least one recording operator means passing through at least one repetitive multiple peak cycloidal path;
(b) power means connected to rotate said operator means about the axis of the planetary mechanism and simultaneously planetating said operator means to follow said cycloidal path;
(c) recording mechanism adapted to impart record data on a record medium positioned adjacent said planetary mechanism and including at least one recording means disposed approximate the circular path which includes all of said cycloidal peaks and normally located adjacent a position of intersection with a peak of said cycloidal path;
(d) selecting means enabling a relative repositioning between said recording means and the cycloidal path of movement of said operator means to assure operative engagement of said operator means with said recording means at one of said cycloidal peak positions with a subsequent resetting of the relative positions to avoid operative engagement between said recording means and an operator means as it moves through the said one cycloidal peak; and (e) feed means enabling a relative movement between a record medium and said recording mechanism to enable successive spaced recording of data on the record medium, comprising: means to guide a thin sheet form record medium past a recording station; a pin type record feed wheel rotatably mounted on the out-feed side of said recording station; a drive connection between said power means and said feed wheel, including a friction slip coupling; an escapement mechanism positively operable through an escapement cycle to permit one step of feed rotation of said feed wheel under slip coupling drive force; a power rotated camming device including at least one camming member; an escapement operating linkage adapted to be shifted to a cocked position in positively latched engagement with said escapement mechanism and projected in the path of rotation of said camming member to be substantially immediately positively impacted, triggered and moved by rotational force of said camming member to positively operate said escapement through one cycle; and a solenoid operator adapted when momentarily energized to engage and shift said escapement operating linkage to its cocked position.

10. A recording device as defined in claim 9, wherein:
(a) means connect said camming device to be continuously rotated by said power means at a sufficiently higher rate of speed than said planetary mechanism is rotated to assure passage of at least one camming member past said escapement operating linkage during a fraction of a recording cycle between recording operating cycles.

11. A recording device as defined in claim 9, including a record medium back-space mechanism comprising:
(a) a ratchet toothed wheel non-rotatably secured to said feed wheel;
(b) a ratchet driving pawl mechanism adapted to be positively shifted from a normal disengaged position to engage a tooth of said ratchet wheel and rotate said feed wheel one step against the rotational force through said slip coupling;
(c) said escapement mechanism including a second ratchet wheel and a double toothed escapement lever which normally serve as a detent against forward feed wheel rotation under rotational force through said slip coupling;
(d) a back-space pawl operating linkage adapted to be shifted to a cocked position, in positively latched engagement with said back-space pawl and projected in the path of rotation of said camming member to be substantially immediately positively impacted, triggered and moved by rotational force of said camming member to positively move said back-space pawl through one cycle; and
(e) a solenoid operator adapted when momentarily energized to engage and shift said back-space pawl operating linkage to its cocked position.

12. A recording device for receiving coded data information signals and recording manifestations of such data information on a record medium, comprising:
(a) a planetary mechanism including at least one recording operator means passing through at least one repetitive multiple peak cycloidal path;
(b) power means connected to rotate said operator means about the axis of the planetary mechanism and simultaneously planetating said operator means to follow said cycloidal path;
(c) recording mechanism adapted to impart record data on a record medium positioned adjacent said planetary mechanism and including at least one recording means disposed approximate the circular path which includes all of said cycloidal peaks and normally locate adjacent a position of intersection with a peak of said cycloidal path;
(d) selecting means enabling a relative repositioning between said recording means and the cycloidal path of movement of said operator means to assure operative engagement of said operator means with said recording means at one of said cycloidal peak positions with a subsequent resetting of the relative positions to avoid operative engagement between said recording means and an operator means as it moves through the said one cycloidal peak;
(e) feed means enabling a relative movement between a record medium and said recording mechanism to enable successive spaced recording of data on the record medium; and
(f) record tape supply and winding apparatus comprising:
 (1) a tape supply reel located adjacent the in-feed side of a recording station;
 (2) a tape take-up winding means located beyond the out-feed side of the recording station;
 (3) a take-up motor, drive connected to said take-up means and having control circuitry; and
 (4) tape guide and condition responsive control means located along a tape guide path between said supply and take-up reels comprising: a tape out station ahead of the recording station including a control device in the control circuitry of the recording device; a tight tape station ahead of the recording station comprising a combined guide roll and control device in the control circuitry of the recording device; a slack tape station located on the out-feed side of the recording station ahead of said take-up means comprising a vertically shiftable roller weight disposed in a depending tape loop, and a control device in said take-up motor control circuitry rendered operable to energize said circuitry by the force of said weight being lowered, upon an increase in said tape loop, to a predetermined lower limit position and rendered operable to de-energize said circuitry by the release of force of weight being raised, by a decrease in said tape loop, to a predetermined upper limit position.

13. A recording device for receiving coded data information signals and recording manifestations of such data information on a record medium, comprising:
(a) a planetary mechanism including at least one recording operator means passing through at least one repetitive multiple peak cycloidal path;
(b) power means connected to rotate said operator means about the axis of the planetary mechanism and simultaneously planetating said operator means to follow said cycloidal path;
(c) recording mechanism adapted to impart record data on a record medium positioned adjacent said planetary mechanism and including at least one recording means disposed approximate the circular path which includes all of said cycloidal peaks and normally located adjacent a position of intersection with a peak of said cycloidal path;
(d) selecting means enabling a relative repositioning between said recording means and the cycloidal path of movement of said operator means to assure operative engagement of said operator means with said recording means at one of said cycloidal peak positions with a subsequent resetting of the relative positions to avoid operative engagement between said recording means and an operator means as it moves through the said one cycloidal peak; and (e) feed means enabling a relative movement between a record medium and said recording mechanism to enable successive spaced recording of data on the record medium comprising: a pin type record feed wheel rotatably mounted on the out-feed side of said recording station; and means adapted to be power operated by said power means under cyclic control of said recording device to rotatably step said pin feed wheel the angular distance between adjacent feed pins once during each cycle of recording operation, and (f) means including a guide device having a flat table with adjustable means at one side enabling the width of a thin sheet form record medium guide path through the recording station to be varied to permit thin sheet form record media of varying width to be fed through said recording station.

14. A recording device as defined in claim 13, wherein said adjustable means comprise:

(a) a plurality of flat wheels rotatably mounted and inset flush with the top of said flat table;

(b) an eccentric undercut pin projecting upward from each said flat wheel and providing a card edge hold down and side guide device;

(c) a manually operable knob coaxially secured to the lower portion of each said flat wheel, at least a portion of said knob extending exterior of the recording device; and (d) means associated with said flat wheels to provide a frictional maintaining force retaining said wheels in adjusted positions.

15. A recording device as defined in claim 13, wherein:

(a) apparatus and controls are provided to selectively enable feed hole punch operation during each recording cycle of operation or completely disable operation of the feed hole punch.

16. A recording device as defined in claim 13, including controls and mechanism enabling use of record cards as a recording medium comprising:

(a) a position locator means comprising a stop device adapted to be raised above and lowered below the flat surface of said table at the out-feed side of the recording station to provide a stop abutment for engagement by the leading edge of a record card;

(b) control means comprising a pressure plate operator covered by a record card inserted into abutment with said stop device, and
(1) means controlled by pressure actuation of said pressure plate to start automatic operation of the recording device and to cause retraction of said stop device below the table surface.

17. A recording device as defined in claim 13, including controls and mechanism enabling use of fanfold records as a recording medium comprising:

(a) a fanfold record position locator means comprising a trigger type sensing device responsive to movement of a single record in a fanfold strip of records to a predetermined start position in the recording device to control a signal means to a recording device controller indicating that the fanfold record medium is ready for perforating operations to commence.

18. A recording device for receiving coded data information signals and recording manifestations of such data information on a record medium, comprising:

(a) a planetary mechanism including at least one recording operator means passing through at least one repetitive multiple peak cycloidal path;

(b) power means connected to rotate said operator means about the axis of the planetary mechanism and simultaneously planetating said operator means to follow said cycloidal path;

(c) recording mechanism adapted to impart record data on a record medium positioned adjacent said planetary mechanism and including at least one recording means disposed approximate the circular path which includes all of said cycloidal peaks and normally located adjacent a position of intersection with a peak of said cycloidal path;

(d) selecting means enabling a relative repositioning between said recording means and the cycloidal path of movement of said operator means to assure operative engagement of said operator means with said recording means at one of said cycloidal peak positions with a subsequent resetting of the relative positions to avoid operative engagement between said recording means and an operator means as it moves through the said one cycloidal peak; and (e) record feed means enabling a relative movement between a thin record medium and said recording mechanism to enable successive spaced recording of data on the record medium comprising: means to guide a thin record medium past a recording station; preliminary record feed means mounted at the infeed side of said recording station; a pin type feed means mounted at the outfeed side of said recording station; means adapted to be power operated by said power means under cyclic control of said recording device to impart coincidence 1:1 ratio feed indexing movements to both of said feed means; and means controlling said preliminary feed means to automatically relinquish its feed engagement with the record medium when the record medium has been stepped past the recording station a sufficient distance to come into feed engagement with said pin type feed means.

19. A recording device as defined in claim 18, wherein said preliminary feed means includes:

(a) a record medium start location device including a member adapted to be engaged by the thin record medium to limit the start position of the record medium to a predetermined location relative to the pins of the pin type feed means; and (b) means, including a control means and a second power means, for operating said preliminary feed means into feed engagement with the record medium and for simultaneously removing said start location device from engagement with the record medium.

20. A recording device as defined in claim 19, wherein said control means for operating said preliminary feed means into feed engagement includes:

(a) an intermittent actuator for energizing said second power means;

(b) a holding means for maintaining said second power means energized; and (c) a record controlled trip device enabling control of said holding means by a record so long as the record has not reached an end-of-record position and thereafter enabling said holding means to de-energize said second power means.

21. A recording device as defined in claim 19, wherein said preliminary feed means comprises:

(a) a cylindrical surface feed roller adapted to engage a surface of a record medium and rotated in coincidence with indexed feed movement of said pin type feed means so its incremental peripheral stepped feed movement is equal to the distance between centers of adjacent pins on said pin type feed means; and (b) an idler D-wheel with a cylindrical portion and a flat portion adapted to be shifted by said second power means toward said feed roller to tightly clamp the thin flat record medium between the cylindrical portion of said D-wheel and said feed roller whereby said record medium is indexed by feed movements of said roller and said D-wheel is conjointly rotated by the passage of said clamped record medium until the flat surface of said D-wheel is rotated into engagement with the record medium and feed clamping of the record medium is disrupted.

22. A recording device as defined in claim 21, wherein said D-wheel comprises:
(a) an extent of said cylindrical portion at least equal to a distance which the record medium must travel from its start position to the location where said pin-type feed means assumes feed engagement of the record medium;
(b) a small radius curved intersection between said cylindrical portion and said flat portion to prevent a reclamping of the preliminary feed during any backspacing of the record medium subsequent to said D-wheel being feed rotated so its said flat surface engages the record medium; and
(c) means connected to said D-wheel to return it to a reset position upon completion of recording machine operations on the record medium.

23. A recording device as defined in claim 18 for operating on record media including tape, cards and fanfold wherein:
(a) a mode control means is provided to determine a mode of machine operation commensurate with the record medium being used, said mode control means including:
(1) a selective device constituting a series controlling portion of said means controlling said preliminary feed means rendering said preliminary feed controlling means operative in card and fanfold modes of operation and inoperative in a tape mode of operation.

24. A recording device as defined in claim 18, wherein said recording station includes:
(a) a record medium feed hole punching apparatus comprising:
(1) a selectively operable feed hole performing means; and
(2) selective control means enabling operation of said perforating means once during each cycle of recording operation and selectively operable to render said perforating means inoperative during recording operations.

25. A recording device as defined in claim 18, wherein said means to guide a thin record medium past a recording station comprises:
(a) a record tape supply means at the infeed side of said recording station;
(b) a record tape take-up means at the outfeed side of said recording station; and
(c) tape guide devices enabling passage of said tape from said supply means through said feed means and recording station to said take-up means;
(d) said take-up means comprising:
(1) a tape slack loop forming and tensioning device;
(2) a selectively operable power driven tape take-up reel means; and
(3) control means, operably engageable by said slack loop forming and tensioning device, connected to and controlling the operation of said power driven take-up reel means so that said take-up reel means rotates to wind tape from said slack loop when said slack loop exceeds a predetermined length and ceases rotation when said slack loop becomes shorter than said predetermined length;
(4) said slack loop being formed by tape which is feeding through said pin type feed means toward said take-up reel means.

26. A recording device as defined in claim 25, wherein said power driven take-up reel means comprises: a tape reel turntable rotatably mounted flush with a machine working surface and with its axis substantially vertical; and a spring biased selectively depressible reel spindle projectable up from said turntable and depressible into said turntable so its upper end is flush with the top surface of said turntable.

27. A recording device as defined in claim 26, wherein: cooperating interlocking means on said turntable and on said spindle enable said spindle to be latched in raised and in depressed positions.

28. A recording device as defined in claim 25, wherein said slack loop forming and tensioning device comprises: a vertical chute with means at its upper end enabling a tape loop to enter said chute adjacent one side and exit from said chute adjacent the opposite side; and means, removable from said chute, slidable vertically in said chute and adapted to be placed over and in engagement with the tape loop in said chute to maintain the loop under at least a slight tension within the chute.

29. A recording device as defined in claim 28, wherein:
(a) said chute is open at bottom; and
(b) said control means for said power driven take-up reel means includes:
(1) a resiliently biased power control operator disposed adjacent said open end of said chute, urged in an upward direction to its inoperative control position under resilient bias force, and adapted to be shifted downward against resilient bias to render the power driven take-up reel means operative upon engagement by the slack tape loop when said loop is increasing because of tape being fed from said recording station.

30. A recording device as defined in claim 18, wherein said means to guide a thin record medium past a recording station comprises:
(a) at least one adjustable record card edge engaging means mounted to cooperate with the machine table and a straight edge guide means, adapted to engage one edge of a record strip and create a light compound biasing force on that one edge resulting in component forces perpendicular to and also parallel to the record strip urging the record strip down against the table surface and back against the straight edge guide means.

31. A recording device as defined in claim 30, wherein said adjustable guide means comprises:
(a) a friction held, rotatably mounted disc having:
(1) a flat upper surface flush with the top of the machine table; and
(2) a manually engageable portion for rotating said disc against its friction mounting;
(b) a strip record edge hold-down button with an inverted frusto-conical surface terminating in a shallow cylindrical boss portion; and
(c) resilient means connecting said button to and located above said disc with its axis substantially parallel with but eccentric to the axis of said disc.

32. A recording device for receiving coded data information signals and recording punched hole manifestations of such data information on a record medium, comprising:
(a) a planetary mechanism including at least one recording operator means passing through at least one repetitive multiple peak cycloidal path;
(b) power means connected to rotate said operator means about the axis of the planetary mechanism and simultaneously planetating said operator means to follow said cycloidal path;
(c) recording mechanism comprising a plurality of code punch and die sets adapted to impart record data on a record medium positioned adjacent said planetary mechanism and including punch actuating means for each code punch and die set disposed approximate the circular path which includes all of said cycloidal peaks and normally located adjacent a position of intersection with a peak of said cycloidal path;
(d) selecting means enabling a relative repositioning between said actuating means and the cycloidal path of movement of said operator means to assure operative engagement of said operator means with said actuating means at one of said cycloidal peak positions with a subsequent resetting of the relative positions to avoid operative engagement between said actuating means and an operator means as the latter moves through the said one cycloidal peak;

(e) feed means enabling a relative movement between a record medium and said recording mechanism to enable successive spaced recording of data on the record medium; and (f) means to collect and direct chad from said punch and die sets away from said recording mechanism comprising:
   (1) a die exit cover; and
   (2) a dry lubricant coating on at least the interior surface of said cover.

33. A recording device as defined in claim 32, wherein said dry lubricant coating includes:
(a) molybdenum disulfide.

34. A recording device comprising:
(a) a power driven rotable member including:
   (1) at least one terminal portion comprising an elongate camming surface eccentric to the axis of the rotatable member constituting a recording operator means which passes through a repetitive path during rotation of said rotatable member;
(b) a recording mechanism comprising a plurality of perforator code hole recording means, and a feed hole recording means, each of which recording means has actuating linkage a portion of which is shiftable into an operative position in the path of said camming surface;
(c) selecting means adapted to engage and shift selected ones of said linkage portions of said code hole recording means into its operative position and to invariably shift the linkage portion of said feed hole recording means into its operative position upon receipt by the recording device of a code signal combination.

35. A recording device as defined in claim 34, wherein:
(a) said recording mechanism comprises a plurality of code punch and die sets with independent operating linkage, a portion of each operating linkage being an impact transfer lever and constituting a one of said recording means; and
(b) said selecting mechanism enables a positioning of selected ones of said impact transfer levers into the path of movement of said operator means to assure a desired operation of code punches representative of a specific punched code signal.

36. A recording device as defined in claim 35, wherein:
(a) each code punch and die set operating linkage includes retract means operative, subsequent to operative engagement of associated selected impact levers, by an operator means to immediately positively retract the punch from an operated position.

37. A recording device as defined in claim 36, wherein:
(a) said retract means comprises a retract member interlocked with said transfer lever and shiftable upon operative punch movement of said transfer lever into a position of intersection with a rotating operator means which, upon engagement with said retracting member, forces it and said associated transfer lever and punch to a retracted position.

38. A recording device as defined in claim 34, wherein:
(a) said selecting means includes a plurality of solenoids equal in number to the number of recording means, individual solenoids being selectively energized upon receipt of a code signal combination and associated with individual linkage portions of said recording means to enable said engagement and shifting of said linkage portions to operative position upon selective energization of said solenoids;
   (1) one of said solenoids being a feed punch solenoid and having a control circuit selectively operable to accomplish energization of said feed punch solenoid every time a code signal combination is received.

39. A recording device as defined in claim 38, wherein said feed solenoid control circuit includes:
(a) an auxiliary control device for selectively opening said control circuit to disable feed punch operation during operation of said recording device.

References Cited by the Examiner

UNITED STATES PATENTS

| | | | |
|---|---|---|---|
| 2,751,223 | 6/1956 | Schairer | 226—104 |
| 2,985,352 | 5/1961 | Kuhlmann | 226—51 |
| 2,996,230 | 8/1961 | Teplitz | 226—104 |
| 3,018,332 | 1/1962 | Johnson et al. | 178—17 |
| 3,088,689 | 5/1963 | Perlini | 242—71 |
| 3,096,919 | 7/1963 | Snyder | 226—3 |
| 3,114,489 | 12/1963 | Legler | 226—3 |
| 3,150,234 | 9/1964 | Anderson et al. | 178—17 |
| 3,155,336 | 11/1964 | Uterhart | 242—71 |
| 3,175,443 | 3/1965 | Kettnich et al. | 83—100 |
| 3,181,759 | 5/1965 | Maples | 226—51 |
| 3,194,095 | 7/1965 | Buck et al. | 83—100 |

NEIL C. READ, *Primary Examiner.*

THOMAS B. HABECKER, *Examiner.*

T. A. ROBINSON, *Assistant Examiner.*